(12) United States Patent
Ciuperca

(10) Patent No.: US 9,809,981 B2
(45) Date of Patent: *Nov. 7, 2017

(54) HIGH PERFORMANCE, LIGHTWEIGHT PRECAST COMPOSITE INSULATED CONCRETE PANELS AND HIGH ENERGY-EFFICIENT STRUCTURES AND METHODS OF MAKING SAME

(71) Applicant: Romeo Ilarian Ciuperca, Norcross, GA (US)

(72) Inventor: Romeo Ilarian Ciuperca, Norcross, GA (US)

( * ) Notice: Subject to any disclaimer, the term of this patent is extended or adjusted under 35 U.S.C. 154(b) by 504 days.

This patent is subject to a terminal disclaimer.

(21) Appl. No.: 14/531,644

(22) Filed: Nov. 3, 2014

(65) Prior Publication Data

US 2015/0118393 A1 Apr. 30, 2015

Related U.S. Application Data

(63) Continuation of application No. 13/626,087, filed on Sep. 25, 2012, now Pat. No. 8,877,329.

(51) Int. Cl.
*E04F 13/02* (2006.01)
*B32B 7/02* (2006.01)
(Continued)

(52) U.S. Cl.
CPC ............ *E04F 13/02* (2013.01); *B32B 3/266* (2013.01); *B32B 5/028* (2013.01); *B32B 7/02* (2013.01); *B32B 7/08* (2013.01); *B32B 13/02* (2013.01); *B32B 13/12* (2013.01); *B32B 13/14* (2013.01); *B32B 15/046* (2013.01); *B32B 15/14* (2013.01); *E04C 2/044* (2013.01); *E04C 2/2885* (2013.01);
(Continued)

(58) Field of Classification Search
CPC ... E04C 5/20; E04C 5/168; E04C 5/18; E04C 2/296; E04C 2/288; E04B 2001/2481
USPC .......................... 52/679, 414, 745.05, 742.2
See application file for complete search history.

(56) References Cited

U.S. PATENT DOCUMENTS 2,053,135 A 9/1936 Dalton
3,199,828 A 8/1965 Newton
(Continued)

OTHER PUBLICATIONS

U.S. Appl. No. 14/610,744, filed Jan. 30, 2015.
(Continued)

*Primary Examiner* — Paola Agudelo
(74) *Attorney, Agent, or Firm* — Robert E. Richards; Richards IP Law

(57) ABSTRACT

The invention comprises a relatively lightweight cementitious-based material panel. The cementitious-based material panel comprises a foam insulating panel having a first surface and a second surface; a first structural layer of cementitious-based material formed on the first surface of the foam insulating panel and affixed thereto; and a second non-structural layer of cementitious-based material formed on the second surface of the foam insulating panel and affixed thereto. The second non-structural layer of cementitious-based material is substantially thinner than the first structural layer of concrete. The second non-structural layer of cementitious-based material is preferably formed from polymer modified concrete, plaster or mortar. A method of making the cementitious-based material panel is also disclosed.

20 Claims, 24 Drawing Sheets

(51) Int. Cl.
  *B32B 7/08* (2006.01)
  *B32B 13/12* (2006.01)
  *E04C 2/04* (2006.01)
  *E04C 2/288* (2006.01)
  *B32B 5/02* (2006.01)
  *B32B 13/02* (2006.01)
  *B32B 13/14* (2006.01)
  *B32B 15/04* (2006.01)
  *B32B 15/14* (2006.01)
  *B32B 3/26* (2006.01)
  *E04B 5/02* (2006.01)

(52) U.S. Cl.
  CPC ..... *B32B 2307/304* (2013.01); *B32B 2307/54* (2013.01); *B32B 2307/718* (2013.01); *E04B 5/02* (2013.01); *E04C 2002/047* (2013.01); *E04F 2203/00* (2013.01); *Y10T 428/2495* (2015.01); *Y10T 428/24967* (2015.01); *Y10T 428/249923* (2015.04)

(56) References Cited

U.S. PATENT DOCUMENTS

| | | |
|---|---|---|
| 3,649,725 A | 3/1972 | Olson |
| 3,732,138 A | 5/1973 | Almog |
| 3,892,516 A | 7/1975 | McGrew et al. |
| 3,985,329 A | 10/1976 | Liegens |
| 4,052,031 A | 10/1977 | Melfi |
| 4,085,495 A | 4/1978 | Hebert |
| 4,090,336 A | 5/1978 | Carroll |
| 4,157,638 A | 6/1979 | Della-Donna |
| 4,334,394 A * | 6/1982 | Mader ................ E04B 1/74 52/309.12 |
| 4,349,398 A | 9/1982 | Kearns et al. |
| 4,370,840 A | 2/1983 | Bisbee et al. |
| 4,462,949 A | 7/1984 | Fehlmann |
| 4,516,372 A | 5/1985 | Grutsch |
| 4,534,924 A | 8/1985 | Kariakin |
| 4,646,498 A | 3/1987 | Schneller et al. |
| 4,669,234 A | 6/1987 | Wilnau |
| 4,744,849 A | 5/1988 | Michaud-Soret |
| 4,765,109 A | 8/1988 | Boeshart |
| 4,811,927 A | 3/1989 | Slonimsky et al. |
| 4,866,897 A | 9/1989 | Yount |
| 4,885,888 A | 12/1989 | Young |
| 4,889,310 A | 12/1989 | Boeshart |
| 4,907,386 A | 3/1990 | Ekroth |
| 5,107,648 A | 4/1992 | Roby |
| 5,171,118 A * | 12/1992 | Rothenbuhler ......... E04B 1/762 411/480 |
| 5,217,339 A | 6/1993 | O'Connor et al. |
| 5,323,578 A | 6/1994 | Chagnon et al. |
| D357,855 S | 5/1995 | Keith et al. |
| 5,493,837 A * | 2/1996 | Hepler ................. E04C 2/296 52/363 |
| 5,497,592 A | 3/1996 | Boeshart |
| 5,570,550 A | 11/1996 | Roby |
| 5,606,832 A | 3/1997 | Keith et al. |
| 5,611,182 A | 3/1997 | Spude |
| 5,761,874 A | 6/1998 | Hayakawa |
| 5,765,318 A | 6/1998 | Michelsen |
| 5,792,552 A | 8/1998 | Langkamp et al. |
| 5,809,723 A | 9/1998 | Keith et al. |
| 5,809,725 A | 9/1998 | Cretti |
| 5,809,726 A | 9/1998 | Spude |
| 5,809,728 A | 9/1998 | Tremelling |
| 5,819,489 A | 10/1998 | McKinney |
| 5,836,126 A | 11/1998 | Harkenrider et al. |
| 5,966,885 A | 10/1999 | Chatelain |
| 5,992,114 A | 11/1999 | Zelinsky et al. |
| 6,026,620 A | 2/2000 | Spude |
| 6,086,349 A | 7/2000 | Del Monte |
| 6,134,861 A | 10/2000 | Spude |
| 6,138,981 A | 10/2000 | Keith et al. |
| 6,234,736 B1 | 5/2001 | Miescher |
| 6,263,638 B1 | 7/2001 | Long, Sr. |
| 6,305,135 B1 * | 10/2001 | Inaba ................ B32B 3/30 52/309.12 |
| 6,314,694 B1 * | 11/2001 | Cooper ............... E04B 2/8611 249/190 |
| 6,360,505 B1 | 3/2002 | Johns |
| 6,426,029 B1 | 7/2002 | Hiscock et al. |
| 6,612,083 B1 | 9/2003 | Richards |
| 6,688,066 B1 | 2/2004 | Cottier et al. |
| 6,725,616 B1 * | 4/2004 | Pease ................. E04B 1/762 52/309.12 |
| 6,729,090 B2 | 5/2004 | Messenger et al. |
| 6,898,908 B2 | 5/2005 | Messenger et al. |
| 6,898,912 B2 | 5/2005 | Bravinski |
| 6,935,081 B2 | 8/2005 | Dunn et al. |
| 7,000,359 B2 | 2/2006 | Meyer |
| 7,398,131 B2 | 7/2008 | Trost et al. |
| 7,409,800 B2 | 8/2008 | Budge |
| 7,765,761 B2 | 8/2010 | Paradis |
| 7,818,935 B2 | 10/2010 | Velickovic |
| 7,934,693 B2 | 5/2011 | Bravinski |
| 8,032,244 B2 | 10/2011 | Trost et al. |
| 8,532,815 B1 | 9/2013 | Ciuperca |
| 8,545,749 B2 | 10/2013 | Ciuperca |
| 8,555,583 B2 | 10/2013 | Ciuperca |
| 8,555,584 B2 | 10/2013 | Ciuperca |
| 8,636,941 B1 | 1/2014 | Ciuperca |
| 8,745,943 B2 | 6/2014 | Ciuperca |
| 8,756,890 B2 | 6/2014 | Ciuperca |
| 8,844,227 B1 | 9/2014 | Ciuperca |
| 8,855,803 B2 | 10/2014 | Ciuperca |
| 8,877,329 B2 | 11/2014 | Ciuperca |
| 8,966,845 B1 | 3/2015 | Ciuperca |
| 2002/0005725 A1 | 1/2002 | Scott |
| 2002/0014048 A1 * | 2/2002 | Meendering ......... E04B 2/8652 52/426 |
| 2002/0092253 A1 | 7/2002 | Beliveau |
| 2003/0192272 A1 | 10/2003 | Bravinski |
| 2004/0129857 A1 | 7/2004 | Musk et al. |
| 2004/0177580 A1 * | 9/2004 | Tremelling ........... E04B 2/8617 52/426 |
| 2005/0108985 A1 | 5/2005 | Bravinski |
| 2007/0062143 A1 | 3/2007 | Noushad |
| 2007/0095255 A1 | 5/2007 | Abbate et al. |
| 2007/0144653 A1 | 6/2007 | Padilla et al. |
| 2008/0041004 A1 * | 2/2008 | Gibbar ................. E04C 2/288 52/309.12 |
| 2008/0173788 A1 | 7/2008 | Brewka et al. |
| 2008/0313991 A1 | 12/2008 | Chouinard |
| 2009/0202307 A1 | 8/2009 | Au et al. |
| 2009/0218474 A1 | 9/2009 | Bowman |
| 2009/0277103 A1 | 11/2009 | De Jaham |
| 2010/0062667 A1 | 3/2010 | Pan et al. |
| 2010/0162659 A1 | 7/2010 | Laprise |
| 2010/0192498 A1 | 8/2010 | Gleckman |
| 2010/0232877 A1 | 9/2010 | Sanvik et al. |
| 2010/0319295 A1 | 12/2010 | Nelson |
| 2011/0057909 A1 | 3/2011 | Itoh |
| 2011/0239566 A1 * | 10/2011 | Ciuperca ............. B23P 11/00 52/259 |
| 2012/0058299 A1 | 3/2012 | Serwin |
| 2013/0074432 A1 | 3/2013 | Ciuperca |
| 2013/0074433 A1 | 3/2013 | Ciuperca |
| 2013/0119576 A1 | 5/2013 | Ciuperca |
| 2014/0041329 A1 | 2/2014 | Ciuperca |
| 2014/0083333 A1 | 3/2014 | Ciuperca |
| 2014/0084132 A1 | 3/2014 | Ciuperca |
| 2014/0087158 A1 | 3/2014 | Ciuperca |
| 2014/0088756 A1 | 3/2014 | Ciuperca |
| 2014/0174647 A1 | 6/2014 | Ciuperca |
| 2014/0212643 A1 | 7/2014 | Ciuperca |
| 2014/0260034 A1 | 9/2014 | Ciuperca |
| 2014/0263942 A1 | 9/2014 | Ciuperca |
| 2014/0272302 A1 | 9/2014 | Ciuperca |
| 2014/0312524 A1 | 10/2014 | Ciuperca |
| 2014/0332658 A1 | 11/2014 | Ciuperca |
| 2014/0333004 A1 | 11/2014 | Ciuperca |

(56) References Cited

U.S. PATENT DOCUMENTS

2014/0333010 A1    11/2014   Ciuperca
2015/0007524 A1     1/2015   Ciuperca
2015/0014300 A1     1/2015   Ciuperca

OTHER PUBLICATIONS

U.S. Appl. No. 14/311,310, filed Jan. 30, 2015.
U.S. Appl. No. 14/227,490, filed Mar. 27, 2015.
U.S. Appl. No. 14/499,205, filed Sep. 28, 2014.
U.S. Appl. No. 14/531,644, filed Nov. 3, 2014.
U.S. Appl. No. 13/626,103, filed Sep. 25, 2012.
U.S. Appl. No. 14/610,772, filed Jan. 30, 2015.
U.S. Appl. No. 14/165,630, filed Jan. 28, 2014.
U.S. Appl. No. 14/499,208, filed Sep. 28, 2014.
U.S. Appl. No. 13/834,697, filed Mar. 15, 2013.
U.S. Appl. No. 14/214,815, filed Mar. 15, 2014.
U.S. Appl. No. 14/275,854, filed May 12, 2014.
U.S. Appl. No. 14/275,833, filed May 12, 2014.
U.S. Appl. No. 14/480,948, filed Sep. 9, 2014.
U.S. Appl. No. 14/480,967, filed Sep. 9, 2014.
U.S. Appl. No. 14/229,566, filed Mar. 28, 2014.

\* cited by examiner

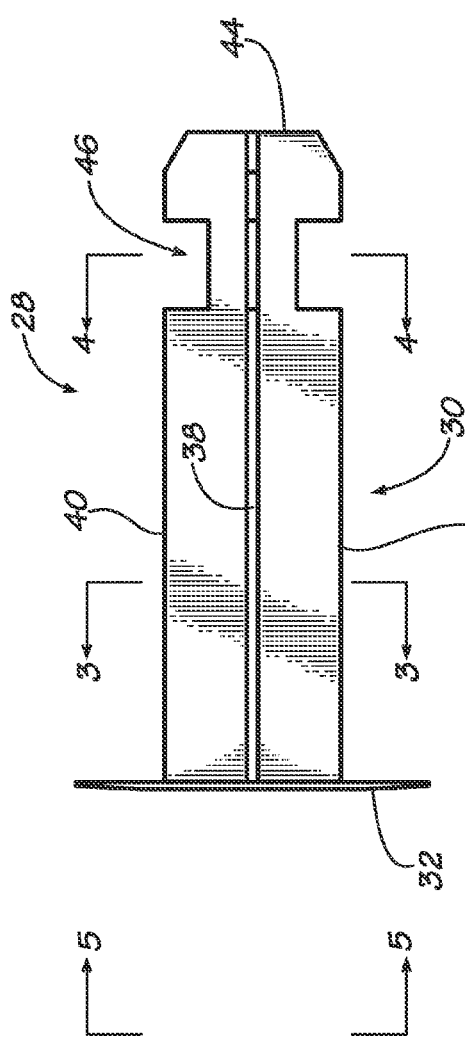
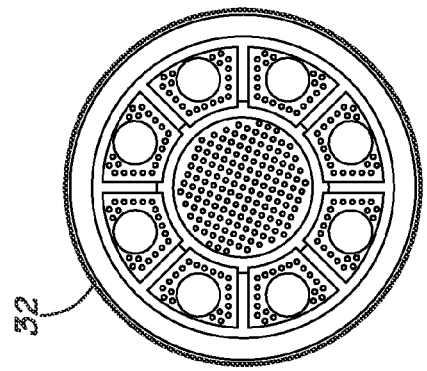
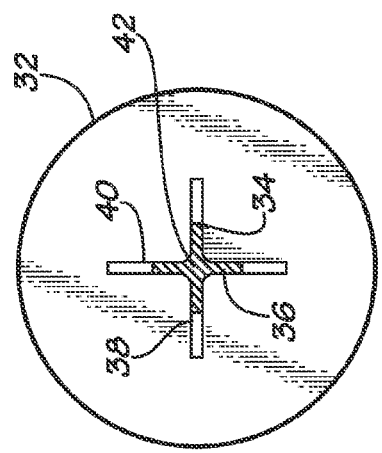
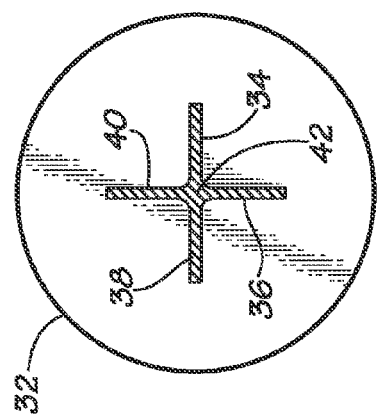
FIG. 2
FIG. 5
FIG. 4
FIG. 3

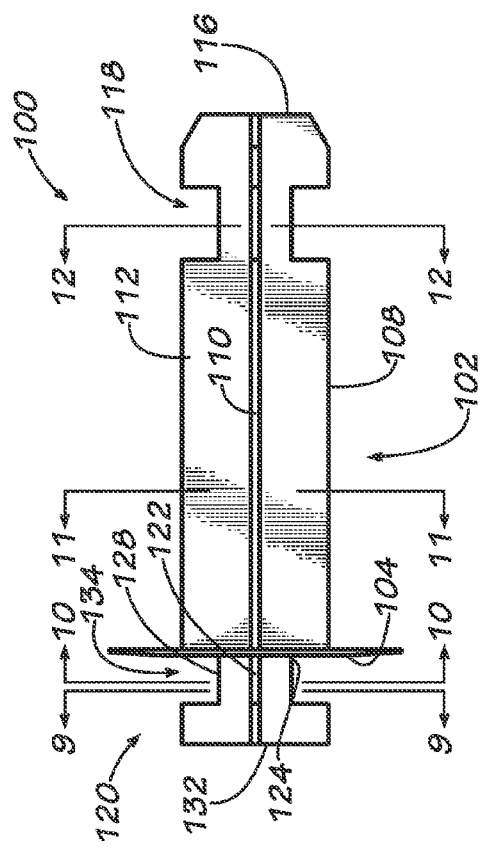
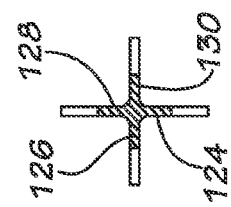
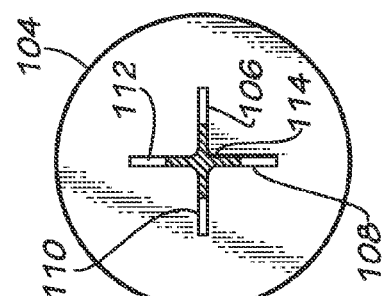
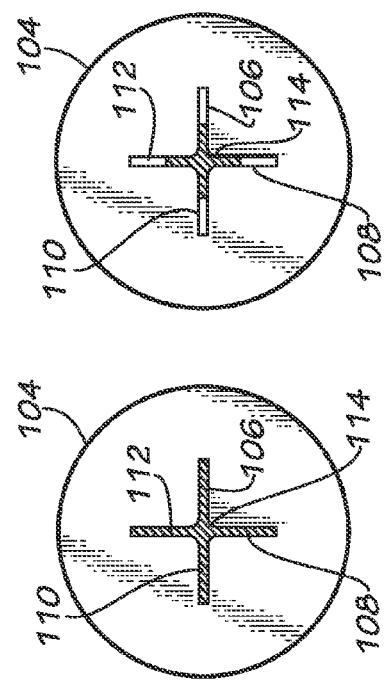
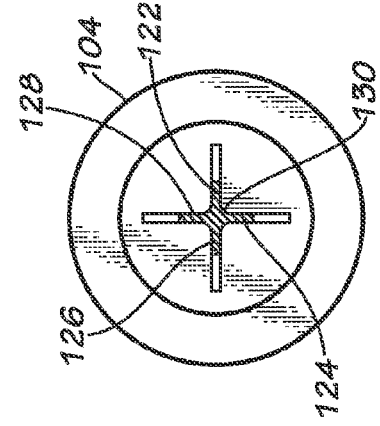

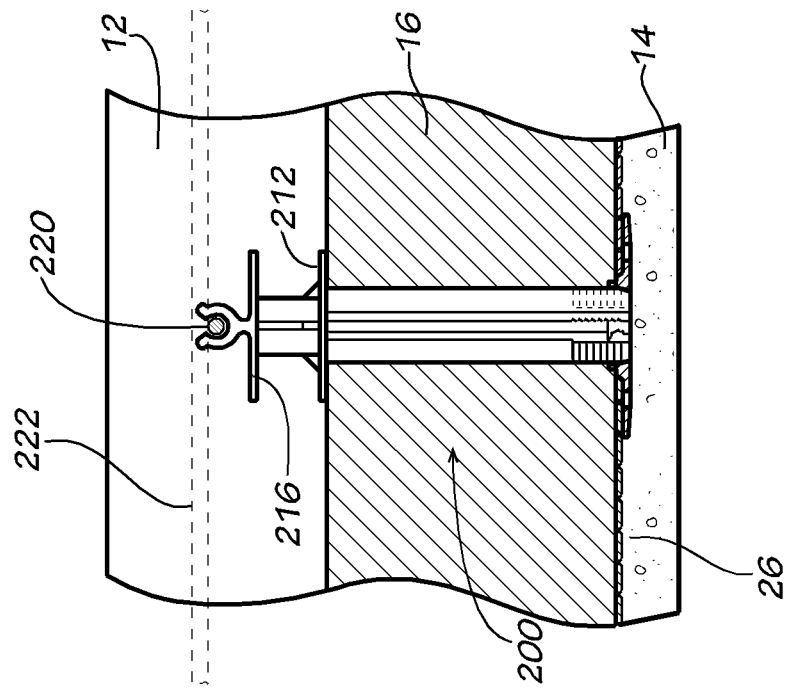
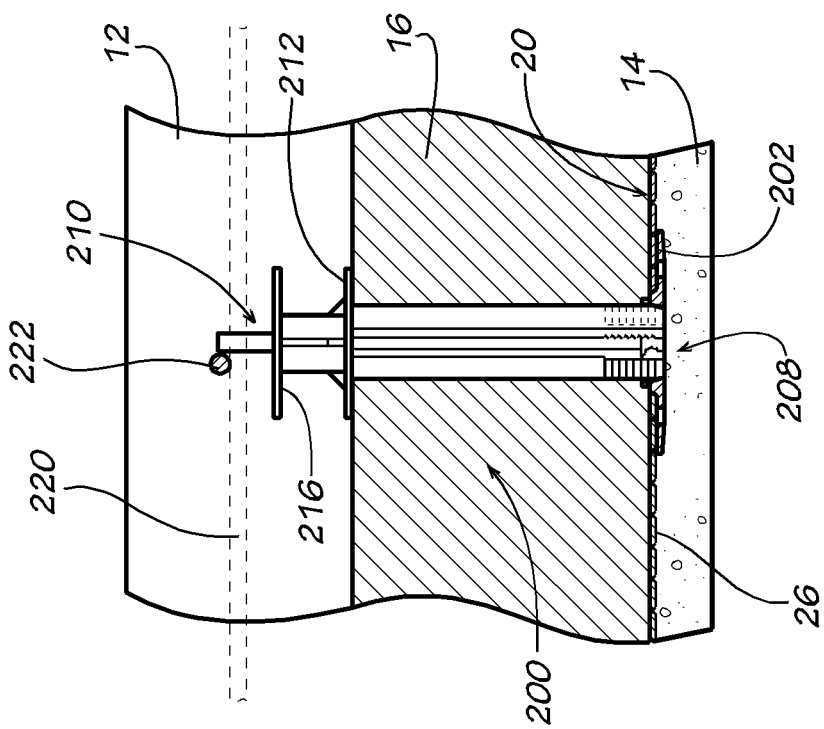

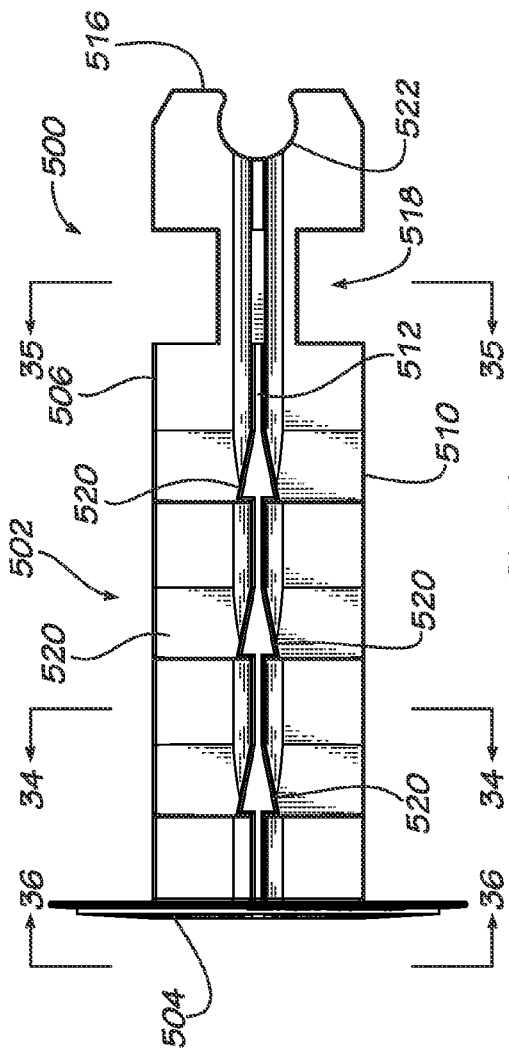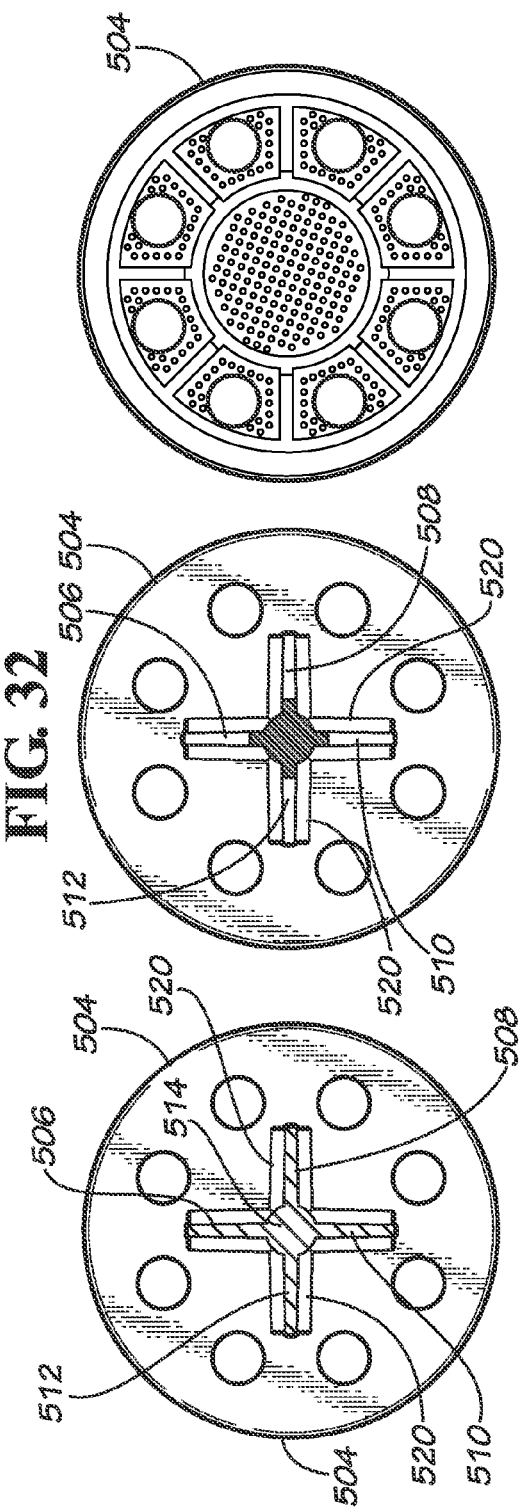
FIG. 32
FIG. 34
FIG. 35
FIG. 36

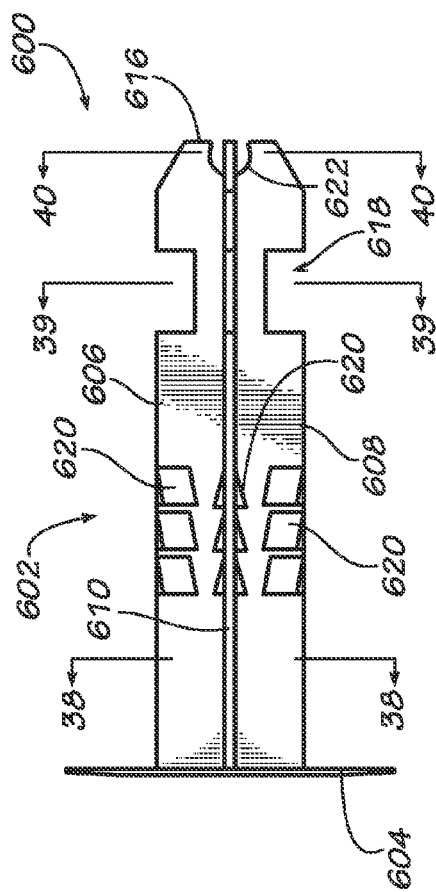
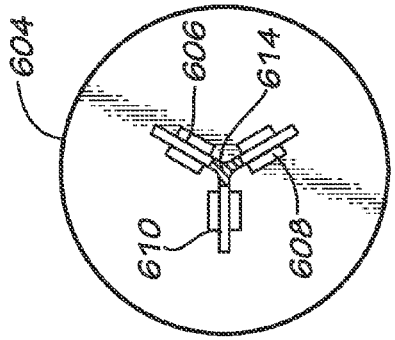
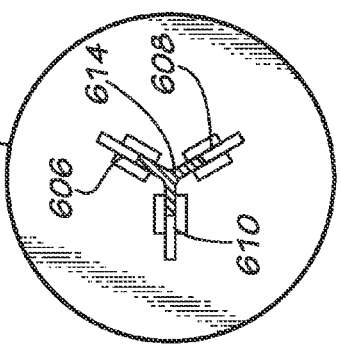
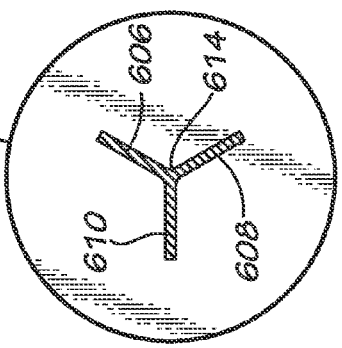

HIGH PERFORMANCE, LIGHTWEIGHT PRECAST COMPOSITE INSULATED CONCRETE PANELS AND HIGH ENERGY-EFFICIENT STRUCTURES AND METHODS OF MAKING SAME

CROSS-REFERENCE TO RELATED APPLICATIONS

The present application is a continuation of application Ser. No. 13/626,087 filed Sep. 25, 2012.

FIELD OF THE INVENTION

The present invention generally relates to the forming of concrete structures. More particularly, this invention relates to precast concrete structures, especially precast concrete panels. The present invention also relates to composite insulated precast concrete panels. The present invention further relates to methods of making composite insulated precast concrete structures, especially architectural precast concrete panels. The present invention also relates to high strength lightweight composite insulated precast concrete panels and to methods of making the same. The present invention relates to highly energy efficient building envelope and methods of achieving same.

BACKGROUND OF THE INVENTION

In the United States, approximately 40% of energy consumption is used to heat and cool buildings. In buildings, the majority of energy loss takes place through the building envelope and the HVAC air intake/exhaust system. The building envelope consists of doors/windows, exterior wall systems and roofing system. While great progress has been made improving the energy efficiency of roof, door and window systems, very little progress has been made in designing truly energy-efficient exterior wall systems.

Framed walls use metal or wood studs to build a frame that can be either load bearing or infill. Multistory buildings can be made from cast-in-place concrete with the exterior perimeter walls being in-filled frame construction. Exterior sheathing is attached to the outside of the frame. On the inside, drywall is used for the inside finish surface. This framing system creates a cavity between the exterior sheathing and the drywall. This cavity is then filled with batt insulation to improve energy efficiency. It is assumed that the R-value of the batt insulation determines the energy efficiency of the wall system. However, there are several drawback of this system. Framing members create thermal bridging. Batt insulation may not completely fill the cavity wall and over time it can sag, leaving no insulation in places. Moisture condensation inside the cavity wall is common which dampens and compresses the batt insulation. When this occurs, the damp batt insulation loses most, if not all, insulating properties. HVAC systems create pressure differentials between the interior and the exterior of the building. These pressure differences cause air to move through the exterior wall system. Simply stated, cavity wall framed systems have poor energy efficiency, among many other problems.

Exterior walls can also be made of concrete, either pre-cast or cast-in-place. Concrete is a composite material comprised of a mineral-based hydraulic binder which acts to adhere mineral particulates together in a solid mass; those particulates may consist of coarse aggregate (rock or gravel), fine aggregate (natural sand or crushed fines). While concrete provides a long lifespan and increased protection from damage, concrete is as cold or as hot as the ambient temperature. Concrete has high thermal mass, which makes it rather expensive to heat or cool in extreme temperatures. In an attempt to alleviate this problem, the inside of the building is insulated. However, such insulation does little to improve energy efficiency as it is generally on the wrong side of the wall; i.e., the interior wall surface. Concrete walls have the advantage that they are barrier systems; i.e., no air can flow through from inside to the outside, but still have poor energy efficiency.

Exterior masonry walls are typically made of CMU (concrete masonry unit) blocks or brick. The block wall cavity is filled with concrete for structural enforcement and foam for insulation. However, this does little to improve energy efficiency since concrete thermal bridging surrounds each foam cell. Brick walls have better insulating properties than concrete or CMU block walls, but still have poor energy efficiency.

Exterior Insulated Finish Systems (EIFS) are used as exterior wall cladding to improve the energy efficiency of the building envelope. EIFS is a versatile, cost effective and relatively energy efficient barrier system. However, EIFS also has several disadvantages. EIFS has relatively low impact resistance. Animals, such as woodpeckers, can cause severe damage to EIFS. And, EIFS is not as long lasting as concrete, stucco or brick. Furthermore, when applied over framing systems there is still a wall cavity to contend with, and drainage cavities are required to mitigate some of the issues associated with the use of EIFS, such as water intrusion, mold and others. Moreover, application of EIFS requires scaffolding the entire building perimeter, which adds cost and time to a construction schedule. Due to all of the above, and more, many owners and architects will simply not consider using EIFS on their projects.

To improve performance and reduce construction schedules, exterior framed walls have been panelized. The exterior building envelope is divided up in small enough panels that can be framed at a plant. These metal framed panels are then sheathed on the exterior face and EIFS, stucco or thin brick is installed over the sheathing. The panels are thus finished and shipped to the project site ready to be erected in place. Steel embeds and connections are used to attached the framed panels to the building structure. While this system improves construction schedules and eliminates the need for exterior scaffolding, but it still includes an exterior wall cavity formed by the framing members, with all its associated shortfalls.

Precast or structural concrete wall panels are known in the art. Precast infill concrete panels are used for non-load bearing purposes. The use of precast concrete wall panels has gained in popularity because they can be manufactured at a remote location, transported to a job site and attached into place, usually be welding steel embeds to a building's structural frame. Precast structural panels can also be formed both onsite and offsite and used to support a load bearing structure of one to four stories tall.

Prior art precast concrete wall panels also have a large thermal mass when exposed to ambient temperatures. They retain the heat in the summer or the cold in the winter very well. Therefore, buildings built with precast concrete panels generally have relatively poor energy efficiency. Such buildings usually require a relatively large amount of energy to keep them warm in the winter and cool in the summer. Since most precast concrete panels are not insulated, they must be insulated on the inside through the use of interior framing systems. This method however does not create a highly energy efficient building envelope. And, since batt insulation of significant thickness is required the interior frame system takes valuable floor space and creates a cavity wall.

More recently, new methods of insulating precast concrete panels have been employed. There are a number of insulated concrete panel systems currently employed. All of them are a "sandwich" type panel. Such panels require placing a layer of foam between two layers of concrete. Some panels are non-composite while others are composite types. While this method improves the insulating properties of a wall and therefore the energy efficiency of a building, it has several drawbacks.

One method involves placing a layer of insulation between a structural concrete layer and an architectural or non-structural concrete layer during the casting of the panel and then erecting this entire non-composite construction as an exterior panel. While this method improves the insulating properties of a wall and therefore the energy efficiency of a building, it has several drawbacks. Instead of having one layer of concrete, the "sandwich" creates two; one that is structural with the larger thermal mass that faces the inside of the building and is insulated from the elements. The second layer of concrete is slightly thinner and placed on the exterior of the building; i.e., on side of the panel opposite the insulated structural layer. Although the second layer is thinner than the first layer, it usually includes steel reinforcing bars ("rebar"). Rebar has to have a minimum embedment of 1½ inches from the exterior face of concrete and is usually placed in the center of the concrete. Therefore, the thinnest exterior concrete is still approximately 3 to 4 inches thick. The second layer is therefore still relatively thick and heavy. The weight of the second layer added to the weight of the first layer makes the entire panel relatively heavy. The American Concrete Institute and industry practice requires that no shear forces be exerted by the first and second layers of the "sandwich" on the insulating layer. Therefore, a bond breaking layer is applied to the insulating layer so that neither the first nor the second layer will adhere thereto. Since there is no bond between the two layers of concrete and the foam, the ties used to connect the two concrete layers have to be engineered to resist the shear pressure from the weight of the second layer of concrete. Generally this is a costly system.

Other methods of sandwich panel construction involve a layer of foam between two wythes (layers) of concrete in a composite type assembly. The inner and outer wythes can be the same thickness or the inner wythe can be thicker while the outer wythe can be thinner. Some use composite plastic ties to hold the two wythes together while others use carbon fiber mesh. Some sandwich panels use pre-stressed cables to achieve the required strength while others use internal trusses. However these panels are heavier and therefore more expensive to manufacture. Since the exterior wythes are made from conventional concrete, they are still considerably thick due to minimum steel embedment code requirements. The thinner the concrete wythes, the more brittle they become which requires use of pre-stressed cable reinforcement or expensive carbon fiber reinforcements. To place the steel embedments, attachments and reinforcement, the thinnest practical concrete thickness is limited to approximately 2 to 3 inches.

Therefore, it would be desirable to provide a system for relatively easily and efficiently insulating precast concrete panels or other structures to achieve the highest energy efficiency possible. It would also be desirable to provide a precast concrete panel system that provides a relatively lightweight precast infill cementitious-based or cementitious panel. It would also be desirable to provide a composite precast insulated panel that is lighter, thinner and stronger than prior art panels. It would also be desirable to provide an integrated architectural finished composite precast insulated panel that can incorporate various types of finish textures, colors, and patterns such as concrete, plaster, stucco, stone, brick, tile and the like.

SUMMARY OF THE INVENTION

In order to build the highest energy efficient building, energy loss through the building envelope must be reduced or eliminated. To eliminate or reduce the most energy loss, the exterior wall should be constructed of materials with the highest thermal mass facing the inside climate controlled (i.e., heated or cooled) space of the building, completely insulated from the environment with the most amount of heat conduction insulating material, such as closed cell foam insulation and/or refractory insulating material, and an exterior wall cladding system with the least amount of thermal mass. It is also desirable to have integrated in such a panel, a wide variety of architectural finishes. The present invention satisfies the foregoing needs by providing an improved precast concrete panel system.

In one disclosed embodiment, the present invention comprises a structure. The structure comprises a foam insulating panel having a first surface and a second surface. A first structural layer of cementitious-based material is formed on the first surface of the foam insulating panel and affixed thereto and a second non-structural layer of cementitious-based material is formed on the second surface of the foam insulating panel and affixed thereto.

In another disclosed embodiment, the present invention comprises a product. The product comprises a foam panel, the panel having a first surface and an opposite second surface. An elongate anchor member has a first end and an opposite second end, a first portion of the anchor member penetrates the foam panel from the first surface to the second surface and a second portion of the anchor member extends outwardly from the second surface of the foam panel. The elongate anchor member has a first enlarged portion adjacent a first end thereof, the first enlarged portion captures a portion of a layer of mesh/lath between the first enlarged portion and the first surface. A first layer of cementitious-based material is formed on the second surface such that the second portion of the anchor member is embedded in the first layer of cementitious-based material and a second layer of cementitious-based material is formed on the mesh/lath and second surface such that the mesh/lath is at least partially embedded in the second layer of cementitious-based material.

In another disclosed embodiment, the present invention comprises a method. The method comprises placing a first quantity of plastic cementitious-based material on a first surface of an insulating material and at least partially curing the first quantity of plastic cementitious-based material such that it is attached to the insulating material. A second quantity of plastic cementitious-based material is placed on a second surface of the insulating material, the first insulating material including mesh/lath attached to the second surface thereof, and at least partially curing the second quantity of plastic cementitious-based material such that it is attached to the mesh/lath and first insulating material.

In another disclosed embodiment, the present invention comprises a method. The method comprises forming a first mold of a desired shape for a precast cementitious-based material structure, the first mold having sides, a bottom and an open top. The method further comprises forming the bottom of the first mold from a first insulating material having insulating properties equivalent to at least 1 inch of expanded polystyrene foam, the first insulating material having a plurality of anchor members attached thereto such that a portion of each anchor member extends upwardly from a first surface of the first insulating material and a mesh/lath material disposed on a second surface thereof, a portion of the mesh/lath being captured between a portion of each of the anchor members and the second surface. The method also comprises placing a first quantity of plastic cementitious-based material in the first mold and on top of a first surface of the first insulating material and allowing the first quantity of cementitious-based material to at least partially cure in the first mold until it has sufficient compressive strength to withstand the stress of being inverted and such that the first quantity of cementitious-based material is attached to the plurality of anchor members. The first insulating material and first quantity of cementitious-based material are then inverted and form the bottom of a second mold. The method further comprises placing a second quantity of plastic cementitious-based material in the second mold and on top of a second surface of the first insulating material and allowing the second quantity of cementitious-based material to at least partially cure in the second mold until it has sufficient compressive strength to withstand the stress of being moved.

Accordingly, it is an object of the present invention to provide an improved precast concrete wall panel.

Another object of the present invention is to provide an improved precast structural or non-structural concrete wall panel construction system.

A further object of this present invention to provide a method of constructing a highly energy efficient precast structural or non-structural concrete wall panel.

Another object of the present invention to provide a method of constructing a highly energy efficient building envelope by using both heat conductive insulating material and radiant heat reflective material between the two layers of concrete.

Another object of the present invention is to provide an exterior wall assembly constructed of materials with the highest thermal mass facing the inside climate controlled (i.e., heated or cooled) space of a building, completely insulated from the environment with the most amount of heat conduction insulating material, such as closed cell foam insulating and/or refractory insulating material, and an exterior wall cladding system with the least amount of thermal mass.

Another object of the present invention is to provide a building system that reduces the urban heat island effect by having the least amount of thermal mass exposed to the environment.

Another object of the present invention is to provide an improved method for making a high performance composite insulated precast structural or non-structural concrete wall panel.

A further object of the present invention is to provide an improved form for an insulated precast concrete wall panel.

Another object of the present invention is to provide a precast spandrel concrete wall panel forming system that allows the concrete panel to be erected more quickly than prior art systems.

Another object of the present invention is to provide an improved precast concrete construction system.

A further object of the present invention is to provide a lightweight or lighter composite insulated precast infill concrete panel and a method for making the same.

A further object of the present invention is to provide a concrete panel and a concrete curing system that uses inert or filler material, such as ground limestone, calcium carbonate, titanium dioxide, or quartz, while producing concrete having an ultimate strength equivalent to, or better than, concrete made with conventional amounts of Portland cement.

A further object of the present invention is to provide a concrete panel and concrete curing system that uses relatively large amounts of recycled industrial waste material, such as slag cement, fly ash, silica fume, pulverized glass, ground or shredded rubber, synthetic fibers, glass, cellulose, carbon or steel fibers, and/or rice husk ash, in combination with inert or filler material, such as ground limestone, calcium carbonate, titanium dioxide, or quartz, while producing concrete having an ultimate strength equivalent to, or better than, concrete made with conventional amounts of portland cement.

Another object of the present invention is to provide a composite insulated precast concrete panel that is thinner and stronger than prior art precast concrete panels.

A further object of the present invention is to provide a composite insulated precast concrete panel that can incorporate various types of architectural finish textures, colors, and patterns, such as concrete, plaster, stucco, stone, brick, tile and the like.

These and other objects, features and advantages of the present invention will become apparent after a review of the following detailed description of the disclosed embodiments and the appended drawing and claims.

BRIEF DESCRIPTION OF THE DRAWINGS

FIG. 2 is a side view of an anchor member in accordance with the present invention.

FIG. 3 is a cross-sectional view taken along the line 3-3 of the anchor member shown in FIG. 2.

FIG. 4 is a cross-sectional view taken along the line 4-4 of the anchor member shown in FIG. 2.

FIG. 5 is a cross-sectional view taken along the line 5-5 of the anchor member shown in FIG. 2.

FIG. 8 is a side view of another disclosed embodiment of an anchor member in accordance with the present invention.

FIG. 9 is a cross-sectional view taken along the line 9-9 of the anchor member shown in FIG. 8.

FIG. 10 is a cross-sectional view taken along the line 10-10 of the anchor member shown in FIG. 8.

FIG. 11 is a cross-sectional view taken along the line 11-11 of the anchor member shown in FIG. 8.

FIG. 12 is a cross-sectional view taken along the line 12-12 of the anchor member shown in FIG. 8.

FIG. 17 is a cross-sectional side view of a panel anchor member/locking caps assembly disclosed in co-pending patent application Ser. No. 13/247,256 filed Sep. 28, 2011 positioned in a foam insulating panel, an interior structural layer of concrete and an exterior non-structural layer of concrete, plaster or mortar of a precast infill concrete panel in accordance with a disclosed embodiment of the present invention.

FIG. 18 is a cross-sectional end view of a panel anchor member/locking caps assembly disclosed in co-pending patent application Ser. No. 13/247,256 filed Sep. 28, 2011 positioned in a foam insulating panel, an interior structural layer of concrete and an exterior non-structural layer of concrete, plaster or mortar of a precast infill concrete panel in accordance with a disclosed embodiment of the present invention.

FIG. 32 is a top plan view of the panel anchor member shown in FIG. 31.

FIG. 34 is a cross-sectional view taken along the line 34-34 of the panel anchor member shown in FIG. 32.

FIG. 35 is a cross-sectional view taken along the line 35-35 of the panel anchor member shown in FIG. 32.

FIG. 36 is a cross-sectional view taken along the line 36-36 of the panel anchor member shown in FIG. 32.

FIG. 37 is a top plan view of another disclosed embodiment of a panel anchor member in accordance with the present invention.

FIG. 38 is a cross-sectional view taken along the line 38-38 of the panel anchor member shown in FIG. 37.

FIG. 39 is a cross-sectional view taken along the line 39-39 of the panel anchor member shown in FIG. 37.

FIG. 40 is a cross-sectional view taken along the line 40-40 of the panel anchor member shown in FIG. 37.

DETAILED DESCRIPTION OF THE DISCLOSED EMBODIMENTS

Figure 1:
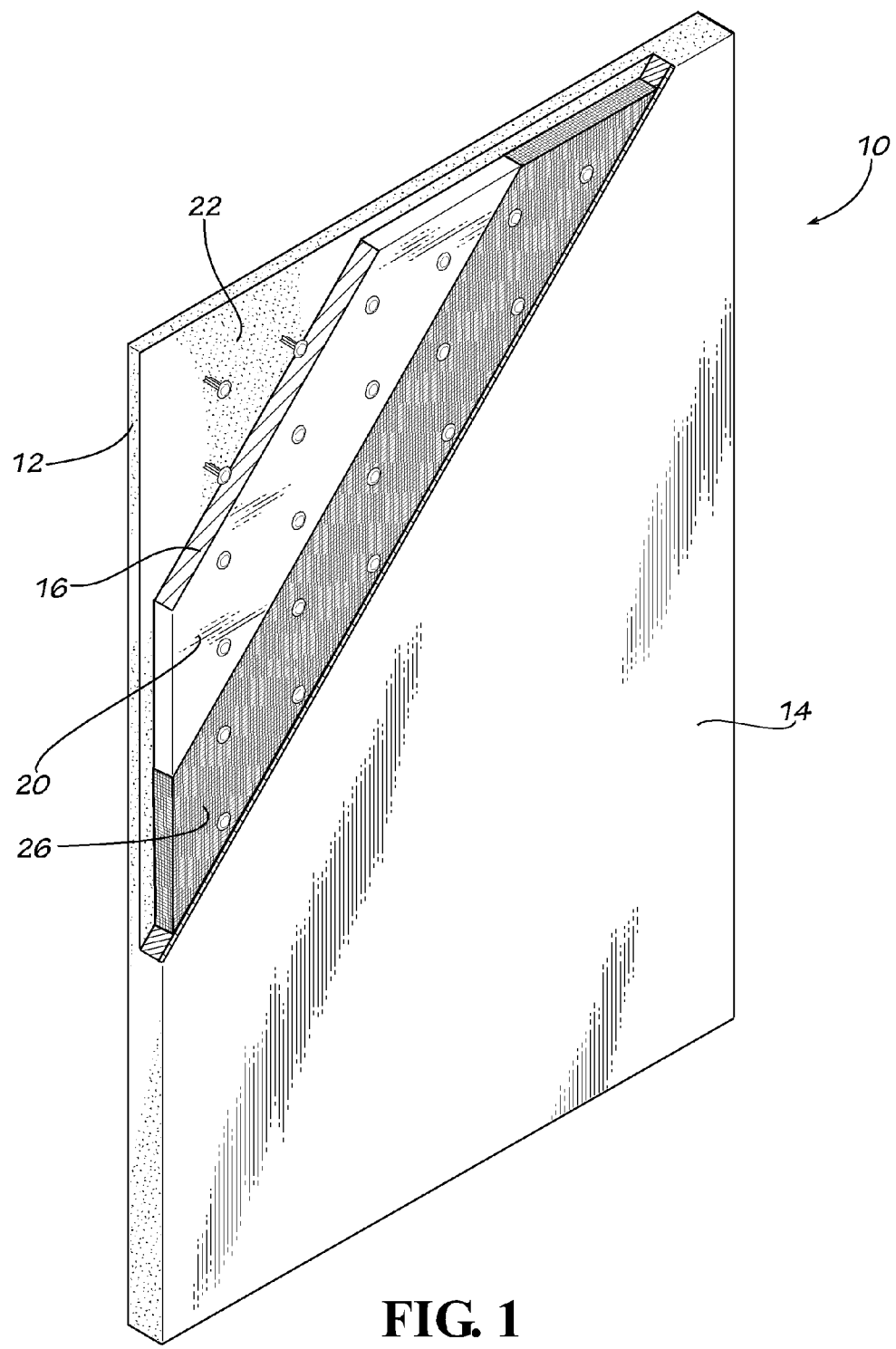
FIG. 1 is a perspective view of a precast infill concrete panel in accordance with a disclosed embodiment of the present invention.

Referring now to the drawing in which like numbers indicate like elements throughout the several views, there is shown in FIG. 1 a disclosed embodiment of a lightweight composite insulated concrete panel 10 in accordance with the present invention. The panel 10 comprises an interior structural layer of concrete or structural interior wythe 12 and an exterior non-structural, architectural layer of concrete or non-structural exterior wythe 14. Disposed between the interior wythe 12 and the exterior wythe 14 is a foam insulating panel 16. The foam insulating panel has an interior primary surface 18 and an exterior primary surface 20. The exterior primary surface 20 defines a single continuous plane across the entire face of the foam insulating panel 16. The foam insulating panel 16 can be made from any insulating material that provides sufficient insulating properties. However, the foam insulating panel 16 preferably is made from a closed cell polymeric foam material, such as molded expanded polystyrene or extruded expanded polystyrene. Other closed cell polymeric foams can also be used, such as polyisocyanurate, polyethylene or polyurethane. The foam insulating panels should also have a density sufficient to make them substantially rigid, such as approximately 1 to approximately 3 pounds per cubic foot, preferably approximately 1.5 pounds per cubic foot. High density expanded polystyrene foam is available under the trademark Neopor® and is available from Georgia Foam, Gainesville, Ga. The foam insulating panel 16 can be made by molding to the desired size and shape, by cutting blocks or sheets of pre-formed extruded expanded polystyrene into a desired size and shape or by extruding the desired shape and then cutting to the desired length. If the foam insulating panel 16 is made from a material other than polystyrene, the foam insulating panel should have insulating properties equivalent to approximately 0.5 and approximately 8 inches of expanded polystyrene foam; more preferably at least 0.5 inches of expanded polystyrene foam; most preferably at least 1 inch of expanded polystyrene foam; especially at least 2 inches of expanded polystyrene foam; more especially at least 3 inches of expanded polystyrene foam; most especially, at least 4 inches of expanded polystyrene foam. Preferably, the foam insulating panel 16 has insulating properties equivalent about 0.5 inches of expanded polystyrene foam; about 1 inch of expanded polystyrene foam; about 2 inches of expanded polystyrene foam; about 3 inches of expanded polystyrene foam; or about 4 inches of expanded polystyrene foam.

Figure 6:
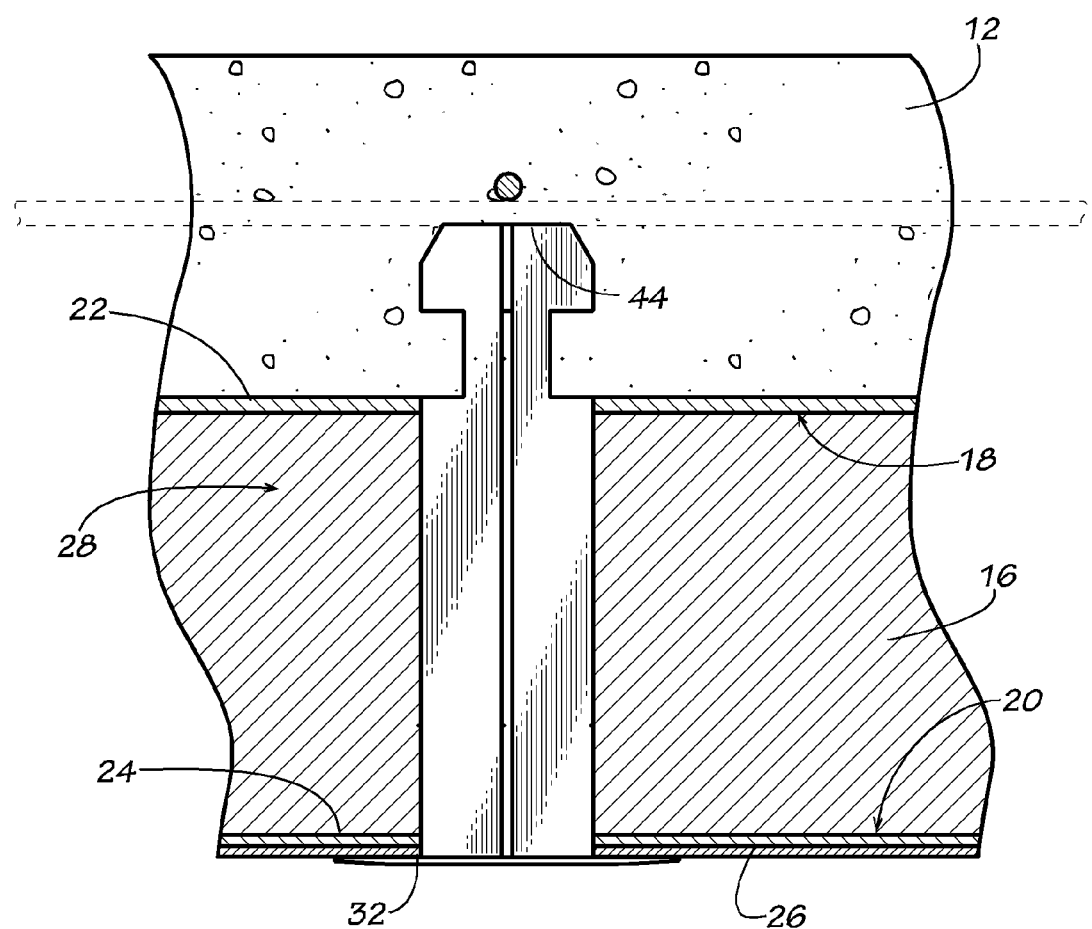
FIG. 6 is a cross-sectional side view of the anchor member shown in FIG. 2 positioned in a foam insulating panel and interior structural layer of concrete in accordance with a disclosed embodiment the present invention.
Figure 7:
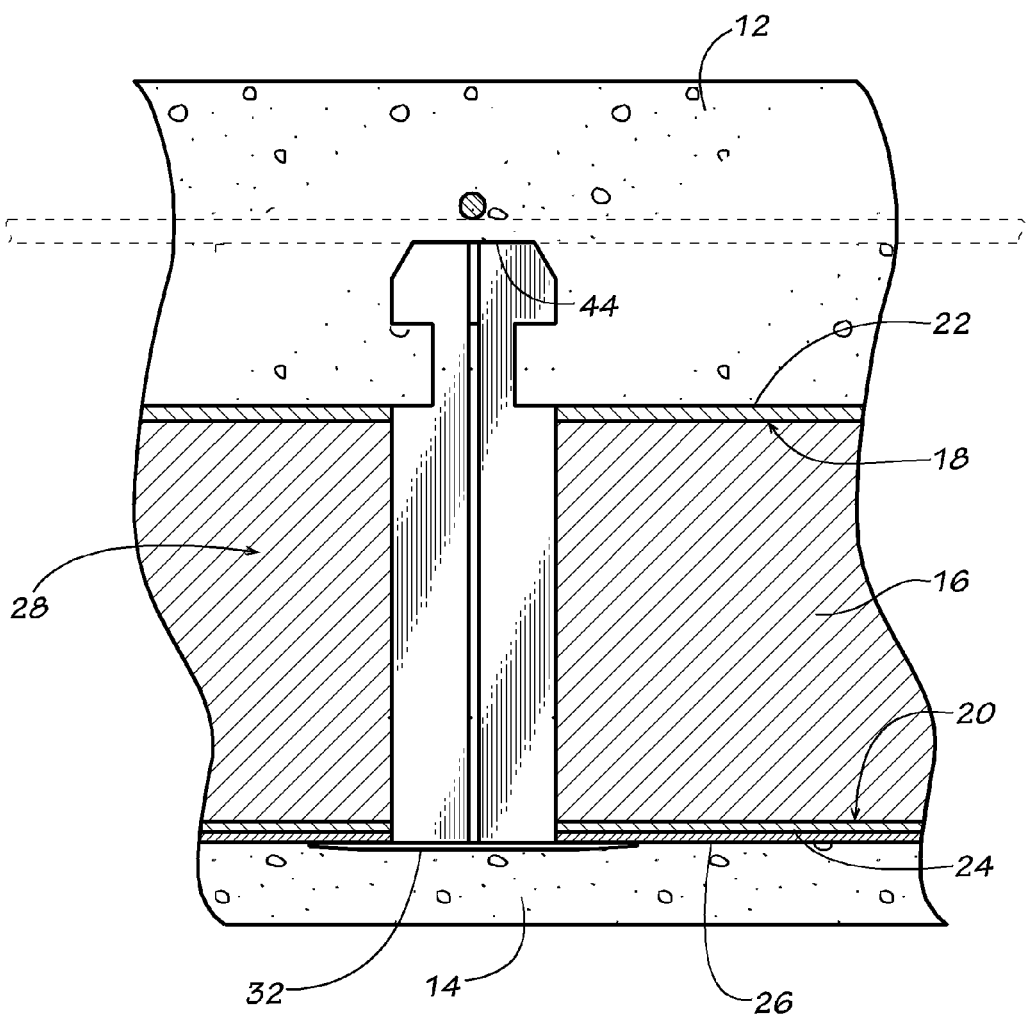
FIG. 7 is a cross-sectional side view of the anchor member shown in FIG. 2 positioned in a foam insulating panel, interior structural layer of concrete and an exterior non-structural layer of concrete, plaster or mortar in accordance with a disclosed embodiment the present invention.

Optionally, but preferably, a layer of radiant heat reflective material 22 is attached to the interior surface 18 or a layer of radiant heat reflective material 24 is attached to the exterior surface 20 of the foam insulating panel 16. Preferably, a layer of radiant heat reflective material 22, 24, such as a metal foil, especially aluminum foil, is attached to both the interior surface 18 and the exterior surface 20 of the foam insulating panel 16, as shown in FIGS. 1, 6 and 7. A preferred radiant heat reflective material is a metalized polymeric film, more preferably, metalized biaxially-oriented polyethylene terephthalate film, especially aluminized biaxially-oriented polyethylene terephthalate film. Biaxially-oriented polyethylene terephthalate film is commercially available under the designation Mylar®, Melinex® and Hostaphen®. Mylar® film is typically available in thicknesses of approximately 1 mil or 2 mil. Aluminized Mylar® film is commercially available from the Cryospares division of Oxford Instruments Nanotechnology Tools Ltd., Abingdon, Oxfordshire, United Kingdom and from New England Hydroponics, Southampton, Mass., USA.

Although refractory insulating material has properties of conductive heat insulating properties, it also has properties of radiant heat reflective properties. Therefore, the layer of radiant heat reflective material 22, 24 can also be made from a refractory insulating material, such as a refractory blanket, a refractory board or a refractory felt or paper. Refractory insulating material is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. Refractory insulating material is commercially available in various form including, but not limited to, bulk fiber, foam, blanket, board, felt and paper form. Refractory insulation is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC, Niagara Falls, N.Y., USA and CS85, Marinite and Transite boards from BNZ Materials Inc., Littleton, Colo., USA. Refractory insulation in felt form is commercially available as Fibrax Felts and Fibrax Papers from Unifrax I LLC, Niagara Falls. The refractory insulating material can be any thickness that provides the desired insulating properties, as set forth above. There is no upper limit on the thickness of the refractory insulating material; this is usually dictated by economics. However, refractory insulating material useful in the present invention can range from $\frac{1}{32}$ inch to approximately 2 inches. Similarly, ceramic fiber materials including, but not limited to, silica, silicon carbide, alumina, aluminum silicate, aluminum oxide, zirconia, calcium silicate; glass fibers, mineral wool fibers, Wollastonite and fireclay, can be suspended in a polymer, such as polyurethane, latex, cement or epoxy, and used as a coating to create a refractory insulating material layer, for example covering, or substantially covering, one of the primary surfaces 18, 20, or both, of the foam insulating panel 16 and used as the radiant heat reflective material 22, 24. Ceramic fibers in a polymer binder are commercially available as Super Therm®, Epoxotherm and HPC Coating from Superior Products, II, Inc., Weston, Fla., USA.

Optionally applied to the exterior surface 20 of the foam insulating panel 16 opposite the interior structural wythe 12 is a layer of mesh or lath 26. The layer of mesh/lath 26 serves to assist in attaching the exterior non-structural wythe 14 to the foam insulating panel 16. The layer of mesh/lath 26 can be made from continuous materials, such as sheets or films, or discontinuous materials, such as fabrics, webs or meshes. The layer of mesh/lath 26 can be made from metal, but is preferably is made from synthetic plastic materials that form the warp and weft strands of a fabric, web or mesh. An especially preferred layer of mesh/lath 26 is disclosed in U.S. Pat. No. 7,625,827 (the disclosure of which is incorporated herein by reference in its entirety). Also, the layer of mesh/lath 26 can be made from carbon fiber, alkaline resistant fiberglass, basalt fiber, aramid fibers, polypropylene, polystyrene, vinyl, polyvinyl chloride (PVC), nylon, from composite materials, such as carbon fibers in polymeric materials, or the like. For example, the layer of mesh/lath 26 can be made from the mesh or lath disclosed in any of U.S. Pat. No. 5,836,715; 6,123,879; 6,263,629; 6,454,889; 6,632,309; 6,898,908 or 7,100,336 (the disclosures of which are all incorporated herein by reference in their entirety). The layer of mesh/lath 26 can be made from metal sheets, such as foils, corrugated metal sheets or perforated metal sheets, and made from materials such as steel or aluminum.

The foam insulating panel 16 includes a plurality of panel anchor members, such as the panel anchor member 28 (FIGS. 2-5). Each panel anchor member 28 is preferably formed from a polymeric thermosetting or thermoplastic material, such as polyethylene, polypropylene, nylon, glass filled thermoplastics or the like. For particularly large or heavy structures, the panel anchor member 28 is preferably formed from glass or mineral fiber filled thermoplastics, such as nylon. An especially preferred material is Wollastonite fiber filled thermoplastic. The panel anchor member 28 can be formed by any suitable process, such as by injection molding or pultrusion.

Each panel anchor member 28 includes an elongate panel-penetrating portion 30 and a flange 32 at an end of the panel-penetrating portion. The flange 32 can be any suitable shape, such as square, oval or the like, but in this embodiment is shown as circular. The flange 32 prevents the panel anchor member 28 from pulling out of the foam insulating panel 16. The flange 32 also traps the layer of mesh/lath 26 between it and exterior surface 20 the foam insulating panel 16, thereby attaching the layer of mesh/lath to the foam insulating panel. The panel-penetrating portion 30 can be any suitable cross-sectional shape, such as square, round, oval or the like, but in this embodiment is shown as having a generally plus sign ("+") cross-sectional shape. The panel-penetrating portion 30 comprises four leg members 34, 36, 38, 40 (FIGS. 3, 4 and 5) extending outwardly from a central core member 42. The plus sign ("+") cross-sectional shape of the panel-penetrating portion 30 prevents the anchor member 28 from rotating around its longitudinal axis during concrete placement. Formed adjacent an end 44 of the panel anchor member 28 opposite the flange 32 is a notch 46. The notch 46 is formed in each of the legs 34-40 adjacent the end 44 of the panel anchor member 28. The notch 46 can be any shape, such as triangular, round, oval or the like, but in this embodiment is shown as having a generally rectangular shape (FIG. 2). The notch 46 gives that portion of the panel penetrating portion 30 an effective narrower diameter than the end 44. Thus, when the notch 46 and end 44 are embedded in plastic concrete, the plastic concrete will flow into the notch. Accordingly, after the concrete hardens that panel anchor member 28 will be securely attached to the hardened concrete.

The foam insulating panel 16 is prepared by forming a plurality of holes in the foam insulating panel to receive the ends, such as the end 44, of the panel penetrating portion, such as the panel penetrating portion 30, of a plurality of panel anchor members identical to the panel anchor member 28. Holes (not shown) in the foam insulating panels 16 can be formed by conventional drilling, such as with a rotating drill bit, by water jets, saw cutting knives or by hot knives. It is also preferable to form the holes in the foam insulating panel 16 after the layer of mesh/lath 26 and optionally the radiant heat reflective material 24 is applied to the exterior surface 20 of the foam insulating panel. Thus, when the holes (not shown) are formed in the foam insulating panel 16, they should also be simultaneously formed in the layer of mesh/lath 26 and optionally in the heat reflective material 24 so that the holes therein (not shown) line up with the holes in the foam insulating panel. The holes (not shown) in the foam insulating panels 16 should also have the same shape as the cross-sectional shape of the panel penetrating portion 30 of the panel anchor member 28, which in this case is a plus sign ("+") shape.

The foam insulating panel 16 is assembled by inserting the foam panel penetrating portion 30 of the panel anchor member 28 through the hole (not shown) in the layer of mesh/lath 26, the radiant heat reflective material 24, if present, and then through the hole in the foam insulating panel, until the flange 26 contacts the layer of mesh/lath and holds that layer of mesh/lath and, optionally the radiant heat reflective material, tightly against the exterior surface 20 of the foam insulating panel. The layer of mesh/lath 26 is preferably also attached to the exterior surface 20 of the foam insulating panel 16 with an adhesive, as described below. Optionally, the radiant heat reflective material 24 can be adhesively attached to the exterior surface 20 of the foam insulating panel 16 using an appropriate adhesive, such as a contact adhesive, an acrylic adhesive or an epoxy adhesive.

As shown in FIG. 1, a plurality of panel anchor members identical to the panel anchor members 28, are positioned in spaced rows and columns across the width and height of the foam insulating panel 16. In the embodiment disclosed herein, the panel anchor members are spaced on 16-inch centers. For example, there are seven vertical columns of eleven vertically spaced panel anchor members, which thereby form eleven rows of seven horizontally spaced anchor members.

In addition to securing the layer of mesh/lath 26 to the foam insulating panel 16, the panel anchor member 28 attaches the interior structural wythe 12 to the foam insulating panel. The panel penetrating portion 30 of the panel anchor member 28 is sufficiently long such that when the panel anchor member is inserted through the foam insulating panel 16 and the flange 32, mesh/lath 26 and optionally the radiant heat reflective material 24 are flush against the exterior surface 20, as shown in FIGS. 6 and 7, the end 44 of the panel anchor member and the notch 46 are disposed above the interior surface 18 of the foam insulating panel. Thus, the panel penetrating portion 30 should extend to approximately the middle (thickness) of the interior structural wythe 12, as shown in FIG. 6. Therefore, for a 4-inch foam insulating panel and a 4-inch interior structural wythe 12, the length of the panel penetrating portion 30 of the panel anchor member 28 from the flange 32 to the end 44 should be approximately 6 inches. Furthermore, the diameter of the flange 32 should be as large as practical to maintain the panel anchor member 28 in a vertical position when plastic concrete is placed in the form. It is found as a part of the present invention that flanges 28 having diameters of approximately 2 to approximately 4 inches, especially approximately 3 inches, are useful in the present invention. Furthermore, the spacing between adjacent panel anchor members 28, will vary depending on factors including the thickness of the interior structural wythe 12 and the thickness of the foam insulating panel 16. However, it is found as a part of the present invention that a spacing of adjacent panel anchor members 28 of approximately 6 inch to approximately 24 inch centers, especially 16 inch centers, is useful in the present invention.

The thickness of the foam insulating panel 16 is also a factor that must be considered in designing the insulated concrete infill panel 10 in accordance with the present invention and will vary depending on factors including the amount of insulation desired, the thickness of the concrete panel, and the dimensions of the concrete panel. There is no maximum thickness for the foam insulating panel 16 that can be used in the present invention. The maximum thickness is only dictated by economics, ease of handing and overall panel design. By combining the radiant heat reflective material 22, 24 with the foam insulating panel 16, the energy efficiency is increased for the same foam thickness, which overall allows for less foam thickness with increased performance.

In FIGS. 8-14 there is shown an alternate disclosed embodiment of the panel anchor member 100. The panel anchor member 100 can be used in the same manner as the panel anchor member 28 described above. The foam insulating panel 16 includes a plurality of panel anchor members, such as the panel anchor member 100. Each panel anchor member 100 is preferably formed from a polymeric material, such as polyethylene, polypropylene, nylon, glass or mineral filled thermoplastics or the like. For particularly large or heavy structures, the panel anchor member 100 is preferably formed from glass filled nylon. The panel anchor member 100 can be formed by any suitable process, such as by injection molding or pultrusion.

Each panel anchor member 100 includes an elongate panel-penetrating portion 102 and a flange 104 at an end of the panel-penetrating portion. The flange 104 can be any suitable shape, such as square, oval or the like, but in this embodiment is shown as circular. The flange 104 prevents the panel anchor member 100 from pulling out of the foam insulating panel 16. The flange 104 also traps the layer of mesh/lath 26 between it and exterior surface 20 the foam insulating panel 16, thereby attaching the layer of mesh/lath to the foam insulating panel. The panel-penetrating portion 102 can be any suitable cross-sectional shape, such as square, round, oval or the like, but in this embodiment is shown as having a generally plus sign ("+") cross-sectional shape. The panel-penetrating portion 102 comprises four leg members 106, 108, 110, 112 (FIGS. 8, 11 and 12) extending radially outwardly from a central core member 114. The plus sign ("+") cross-sectional shape of the panel-penetrating portion 102 prevents the panel anchor member 100 from rotating around its longitudinal axis during concrete placement. Formed adjacent an end 116 of the panel anchor member 100 opposite the flange 104 is a notch 118. The notch 118 is formed in each of the legs 106-112 adjacent the end 116 of the panel anchor member 100. The notch 118 can be any shape, such as triangular, round, oval or the like, but in this embodiment is shown as having a generally rectangular shape (FIG. 8).

Extending outwardly from the flange 104 opposite from the panel penetrating portion 102 is a second anchor portion 120. The second anchor portion 120 can be any suitable cross-sectional shape, such as square, round, oval or the like, but in this embodiment is shown as having a generally plus sign ("+") cross-sectional shape. The second anchor portion 120 comprises four leg members 122, 124, 126, 128 (FIGS. 8 and 10) extending radially outwardly from a central core member 130. Formed adjacent an end 132 of the second anchor portion 120 intermediate the flange 104 and the end 132 is a notch 134. The notch 134 is formed in each of the legs 122-128 adjacent the end 132 of the second anchor portion 132. The notch 134 can be any shape, such as triangular, round, oval or the like, but in this embodiment is shown as having a generally rectangular shape (FIG. 8).

The foam insulating panel 16 is prepared by forming a plurality of holes in the foam insulating panel to receive the ends, such as the end 116, of the panel penetrating portion, such as the panel penetrating portion 102, of a plurality of panel anchor members identical to the panel anchor member 100. Holes (not shown) in the foam insulating panels 16 can be formed by conventional drilling, such as with a rotating drill bit, by water jets, saw cutting knives or by hot knives. It is also preferable to form the holes in the foam insulating panel 16 after the layer of mesh/lath 26 and optionally the radiant heat reflective material 24 is applied to the exterior surface 20 of the foam insulating panel. Thus, when the holes (not shown) are formed in the foam insulating panel 16, they should also be simultaneously formed in the layer of mesh/lath 26 and optionally in the heat reflective material 24 so that the holes therein (not shown) line up with the holes in the foam insulating panel. The holes (not shown) in the foam insulating panels 16 should also have the same shape as the cross-sectional shape of the panel penetrating portion 102 of the panel anchor member 100, which in this case is a plus sign ("+") shape.

The foam insulating panel 16 is assembled by inserting the panel penetrating portion 102 of the panel anchor member 100 through the hole (not shown) in the layer of mesh/lath 26, the radiant heat reflective material 24, if present, and then through the hole in the foam insulating panel, until the flange 104 contacts the layer of mesh/lath and holds the layer of mesh/lath and optionally the radiant heat reflective material tightly against the exterior surface 20 of the foam insulating panel. Optionally, the radiant heat reflective material 24 can be adhesively attached to the exterior surface 20 of the foam insulating panel 16 using an appropriate adhesive, such as a contact adhesive, an acrylic adhesive or an epoxy adhesive. As shown in FIG. 1, a plurality of panel anchor members identical to the panel anchor members 100, are positioned in spaced rows and columns across the width and height of the foam insulating panel 16.

Figure 13:
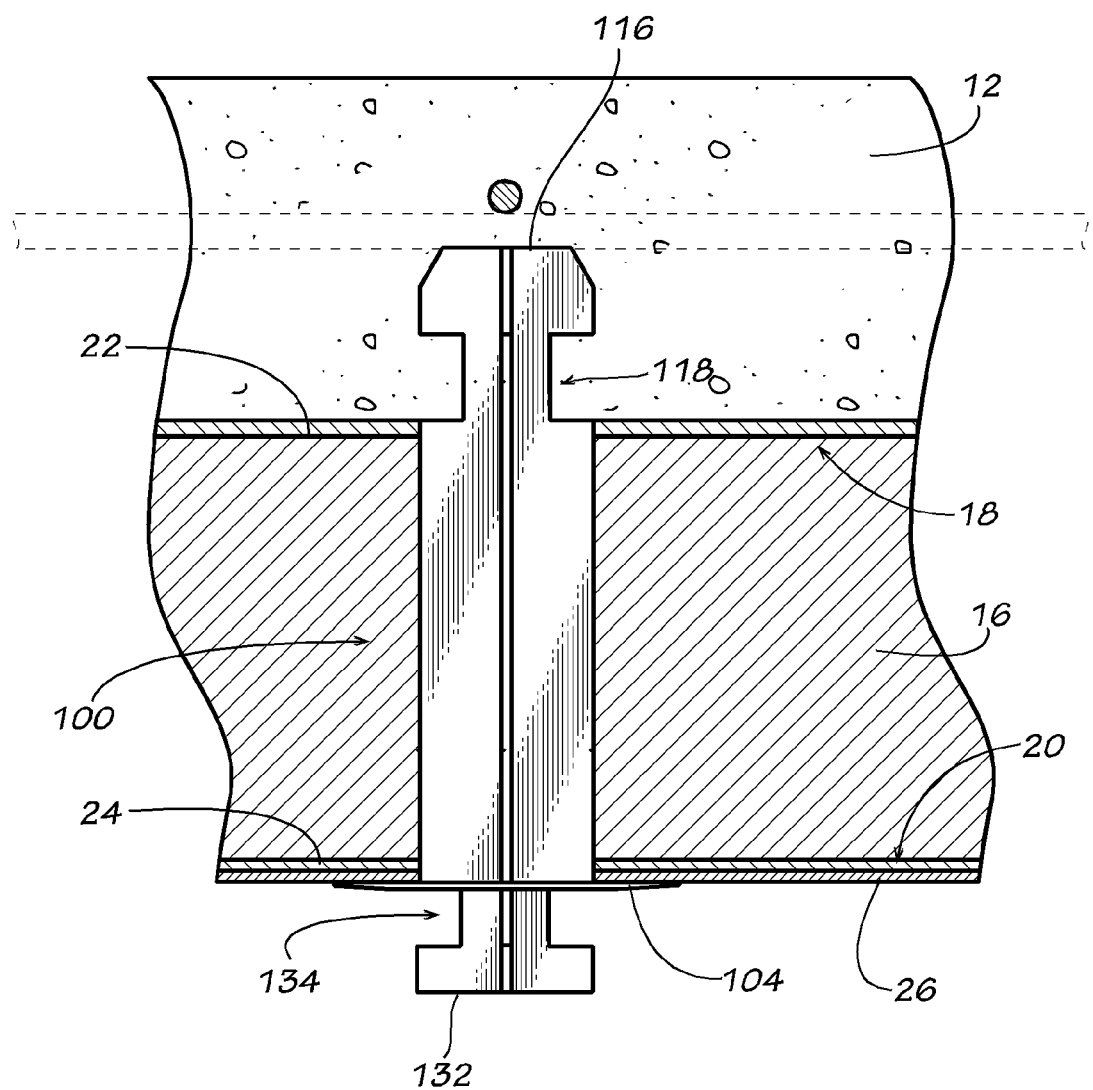
FIG. 13 is a cross-sectional side view of the anchor member shown in FIG. 8 positioned in a foam insulating panel and interior structural layer of concrete in accordance with a disclosed embodiment the present invention.
Figure 14:
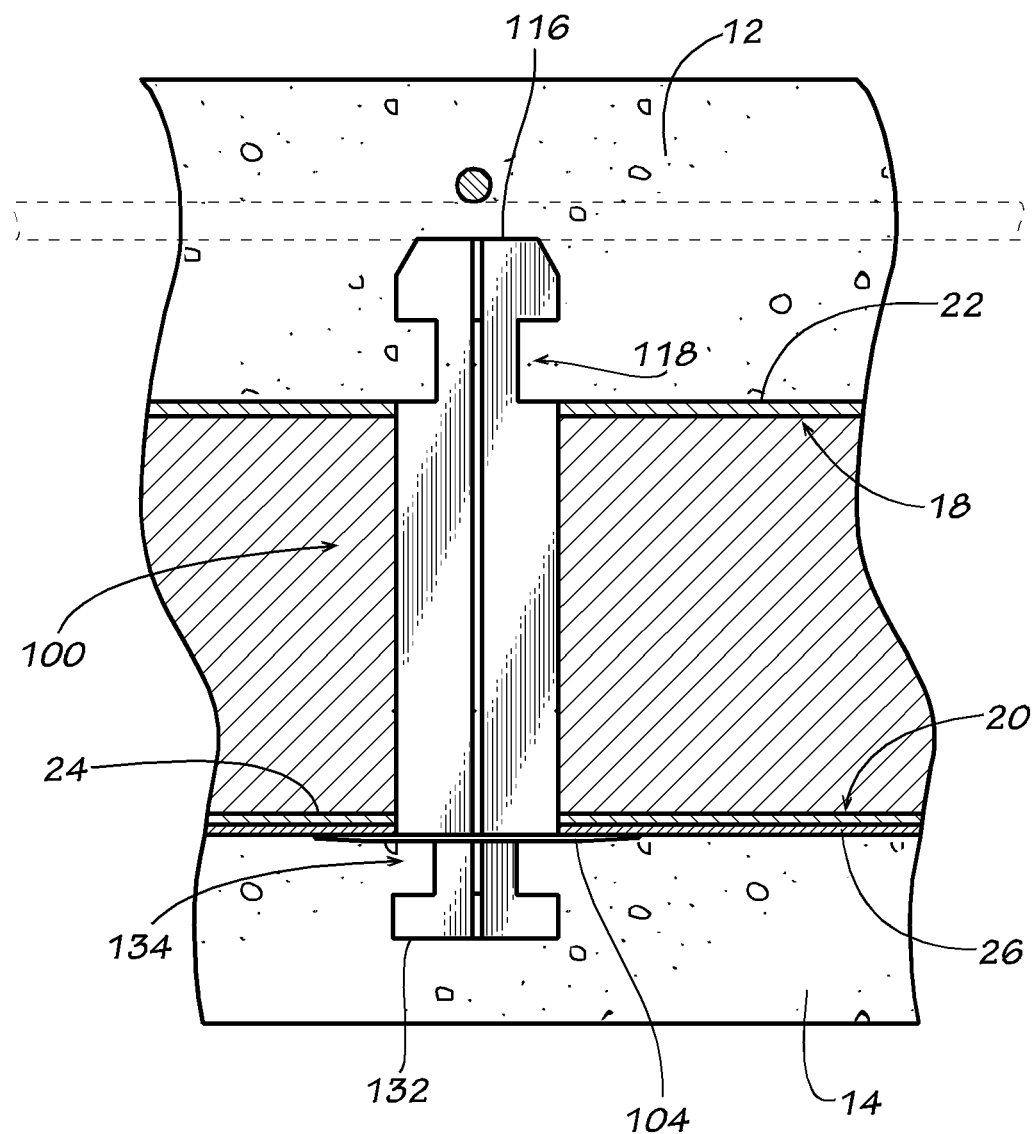
FIG. 14 is a cross-sectional side view of the anchor member shown in FIG. 8 positioned in a foam insulating panel, interior structural layer of concrete and an exterior non-structural layer of concrete, plaster or mortar in accordance with a disclosed embodiment the present invention.
Figure 16:
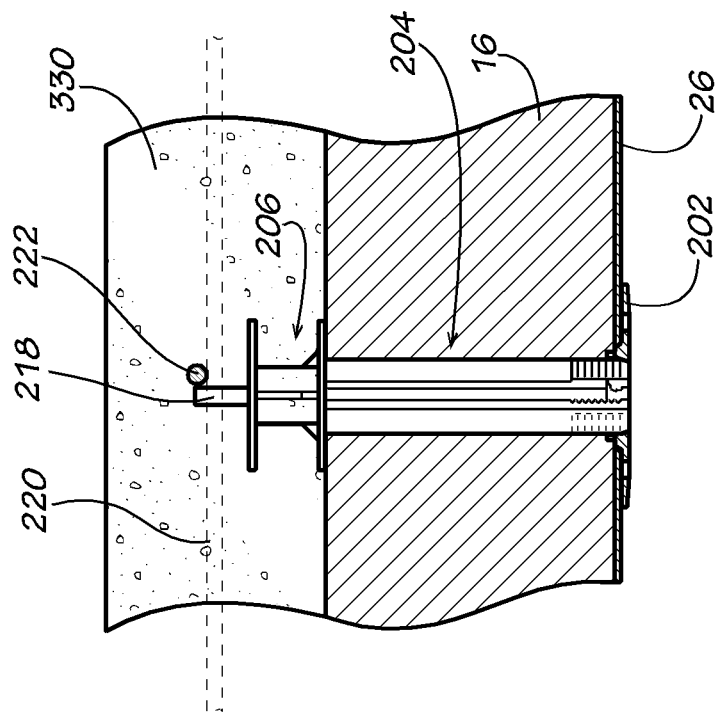
FIG. 16 is a cross-sectional end view of a panel anchor member/locking caps assembly disclosed in co-pending patent application Ser. No. 13/247,256 filed Sep. 28, 2011 positioned in a foam insulating panel and an interior structural layer of concrete of a precast infill concrete panel in accordance with a disclosed embodiment of the present invention.
Figure 15:
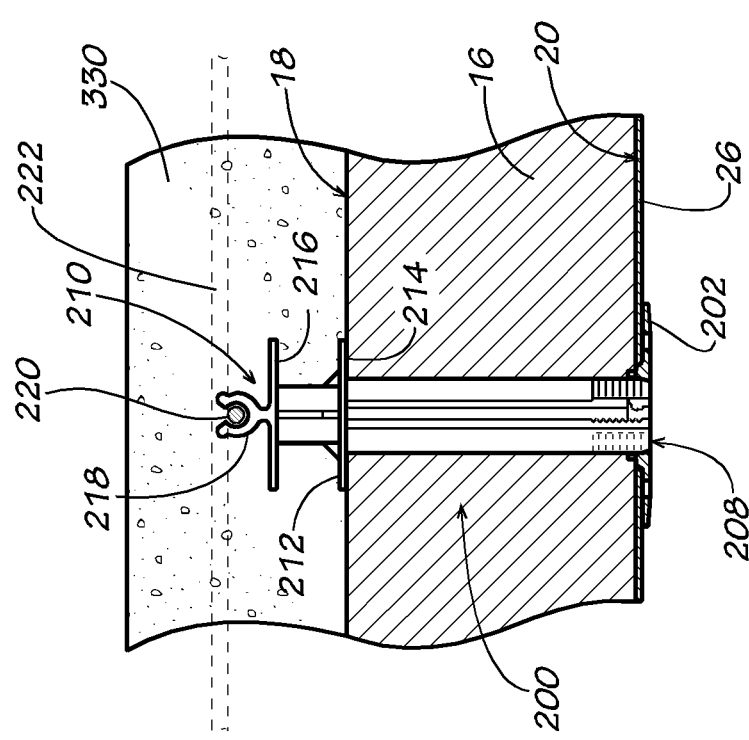
FIG. 15 is a cross-sectional side view of a panel anchor member/locking caps assembly disclosed in co-pending patent application Ser. No. 13/247,256 filed Sep. 28, 2011 positioned in a foam insulating panel and an interior structural layer of concrete of a precast infill concrete panel in accordance with a disclosed embodiment of the present invention.

In addition to securing the layer of mesh/lath 26 to the foam insulating panel 16, the panel anchor member 100 attaches the interior structural wythe 12 and the non-structural exterior wythe 14 to the foam insulating panel. The panel penetrating portion 102 of the panel anchor member 100 is sufficiently long such that when the panel anchor member is inserted through the foam insulating panel 16 and the flange 104, layer of mesh/lath 26 and the radiant heat reflective material 24, if present, are flush against the exterior surface 20, as shown in FIG. 13, and the end 116 of the panel anchor member and the notch 118 are disposed above the interior surface 18 of the foam insulating panel. Thus, the panel penetrating portion 102 should extend to approximately the middle (thickness) of the interior structural wythe 12, as shown in FIG. 13. Therefore, for a 4-inch foam insulating panel and a 4-inch interior structural wythe 12, the length of the panel penetrating portion 102 of the panel anchor member 100 from the flange 104 to the end 116 should be approximately 6 inches. Additionally, the second anchor portion 120 of the panel anchor member 100 is sufficiently long so that it extends into the exterior non-structural wythe 14. Therefore, for a 1 inch exterior non-structural wythe 14, the length of the second anchor portion 120 from the flange 104 to the end 132 can be about 0.25 inches to about 0.75 inches. For different thicknesses of the interior structural wythe 12 and the exterior non-structural wythe 14, different length of the panel penetrating portion 102 and the second anchor portions 120 can be used.

The diameter of the flange 104 should be as large as practical to maintain the panel anchor member 100 in a vertical position when plastic concrete is placed in the form. It is found as a part of the present invention that a flange 104 having a diameter of approximately 2 to approximately 4 inches, especially approximately 3 inches, is useful in the present invention. Furthermore, the spacing between adjacent panel anchor members 100, will vary depending on factors including the thickness of the interior structural wythe 12, the thickness of the exterior non-structural wythe 14 and the thickness of the foam insulating panel 16. However, it is found as a part of the present invention that a spacing of adjacent panel anchor members 100 of approximately 6 inch to approximately 24 inch centers, especially 16 inch centers, is useful in the present invention.

In an alternate disclosed embodiment, the panel anchor member/locking cap assemblies disclosed in applicant's co-pending patent application Ser. No. 13/247,256 filed Sep. 28, 2011 (the disclosure of which is incorporated herein by reference in its entirety) are used in place of the panel anchor members 28, 100 disclosed above. FIGS. 15-18 show the use of the anchor member/locking cap assembly disclosed in co-pending patent application Ser. No. 13/247,256 in the present invention (the disclosure of which is incorporated herein by reference in its entirety). Specifically, an anchor member/locking cap assembly includes two separate pieces: a panel anchor member 200 and a locking cap 202. The panel anchor member 200 includes an elongate panel-penetrating portion 204 and an elongate concrete anchor portion 206. The panel-penetrating portion 204 can be any suitable cross-sectional shape, such as square, round, oval or the like, but in this embodiment is shown as having a generally plus sign ("+") cross-sectional shape. The panel-penetrating portion 204 comprises four leg members extending outwardly from a central core member. The plus sign ("+") cross-sectional shape of the panel-penetrating portion 204 prevents the panel anchor member from rotating around its longitudinal axis during concrete placement. Formed intermediate each end 208, 210 of the panel anchor member is a central flange 212 that extends outwardly radially from the leg members of the panel penetrating portion 200. The central flange 212 can be any shape, such as square, oval or the like, but in this embodiment is shown as having a round shape. The central flange 212 includes a generally flat foam insulating panel contacting portion 214.

The concrete anchor portion 206 of the panel anchor member 200 comprises four outwardly extending elongate leg members. Formed at the end of the concrete anchor portion 206 opposite the flange 212 is another flange 216 that extends radially outwardly from the leg members of the concrete anchor portion. The flange 216 can be any suitable shape, such as square, oval or the like, but in this embodiment is shown as circular. The flange 216 prevents the panel anchor member 200 from pulling out of the concrete after it is cured.

On each of the legs adjacent the end 208 of the panel anchor member 200 is formed a plurality of teeth (not shown). The locking cap 202 defines an opening for receiving the end 208 of the panel anchor member 200. The opening is sized and shaped such that the four legs of the panel penetrating portion 204 will fit through the opening. Formed within the opening are four latch fingers (not shown). Each latch finger includes a plurality of teeth that are sized and shaped to mate with the teeth on the panel anchor member 200. Each latch finger is designed so that it can move outwardly when the end 208 of the panel anchor member 200 is inserted in the opening of the locking cap 202, but will tend to return to its original position due to the resiliency of the plastic material from which it is made. Thus, as the end 208 of the panel anchor member 200 is inserted into and through the opening of the locking cap 202, the teeth on the latch fingers will ride over the teeth on the panel penetrating portion 204. However, once the teeth of the locking cap 202 mate with the teeth on the panel anchor member 200 they prevent removal of the panel anchor member from the locking cap. The teeth therefore provide a one-way locking mechanism; i.e., the locking cap 202 can be relatively easily inserted onto the panel anchor member 200, but once fully inserted, the locking cap is locked in place and cannot be removed from the panel anchor member under normally expected forces. As shown in FIGS. 15-18, layer of the mesh/lath 26 is captured between the locking cap 202 and the exterior surface 20 of the foam insulating panel 16 thereby holding the layer of mesh/lath in place. The layer of mesh/lath 26 is also attached to the exterior surface 20 of the foam insulating panel 16 by a conventional adhesive, such as an acrylic adhesive or an acrylic elastomeric adhesive. However, it is preferred that the layer of mesh/lath 26 be laminated to the exterior surface 20 of the foam insulating panel 16 using a polymeric material that also forms a weather or moisture barrier on the exterior surface of the foam insulating panels. The weather barrier can be applied to the layer of mesh/lath 26 on the surface 20 of the foam insulating panel 16 by any suitable method, such as by spraying, brushing or rolling. The moisture barrier can be applied as the laminating agent for the layer of mesh/lath 26 or it can be applied in addition to an adhesive used to adhere the layer of mesh lath to the outer surface 20 of the foam insulating panel 16. Suitable polymeric materials for use as the moisture barrier are any water-proof polymeric material that is compatible with both the material from which the layer of mesh/lath 26 and the foam insulating panel 16 are made; especially, liquid applied weather membrane materials. Useful liquid applied weather membrane materials include, but are not limited to, WeatherSeal® by Parex of Anaheim, Calif. (a 100% acrylic elastomeric waterproof membrane and air barrier which can be applied by rolling, brushing, or spraying) or Senershield® by BASF (a one-component fluid-applied vapor impermeable air/water-resistive barrier that is both waterproof and resilient) available at most building supply stores. In a another disclosed embodiment, the layer of mesh/lath 26 is not laminated to the foam insulating panel 16 at all. The cementetious material from the exterior non-structural wythe 14 will then encapsulate and bond around the layer of mesh/lath 26 and to the exterior surface 20 of the foam insulating panel 16.

Use of the present invention will now be considered. It is anticipated that the insulated concrete panel 10 will be preassembled at a remote location and then transported to a job site. The composite insulated concrete panel 10 is constructed offsite by first assembling the foam insulating panel 16, layer of mesh/lath 26 and either the anchor member 28 (FIGS. 2-7), the anchor member 100 (FIGS. 8-14) or the panel anchor member/locking cap assembly 200 (FIGS. 15-18) disclosed in co-pending patent application Ser. No. 13/247,256, as described above, and optionally one of the layer of the radiant heat reflective material 22, 24, or both. Although any of the anchor members 28, 100 or the panel anchor member/locking cap assembly 200, 202 disclosed in co-pending patent application Ser. No. 13/247,256 can be used equally well in the present invention, the invention well be described further below only with respect to the panel anchor member/locking cap assembly 200, 202 disclosed in co-pending patent application Ser. No. 13/247,256 and shown in FIGS. 15-18.

As can be seen in FIGS. 1, 19, 22 and 23, the dimensions of the layer of mesh/lath 26 are larger than that of the foam insulating panel 16. The layer of mesh/lath 26 is sized and shaped such that the layer of mesh/lath covers both the exterior surface 20 of the foam insulating panel 16 and the four peripheral edges 300, 302, 304, 306 of the foam insulating panel (FIGS. 1, 19, 22 and 23).

Figure 19:
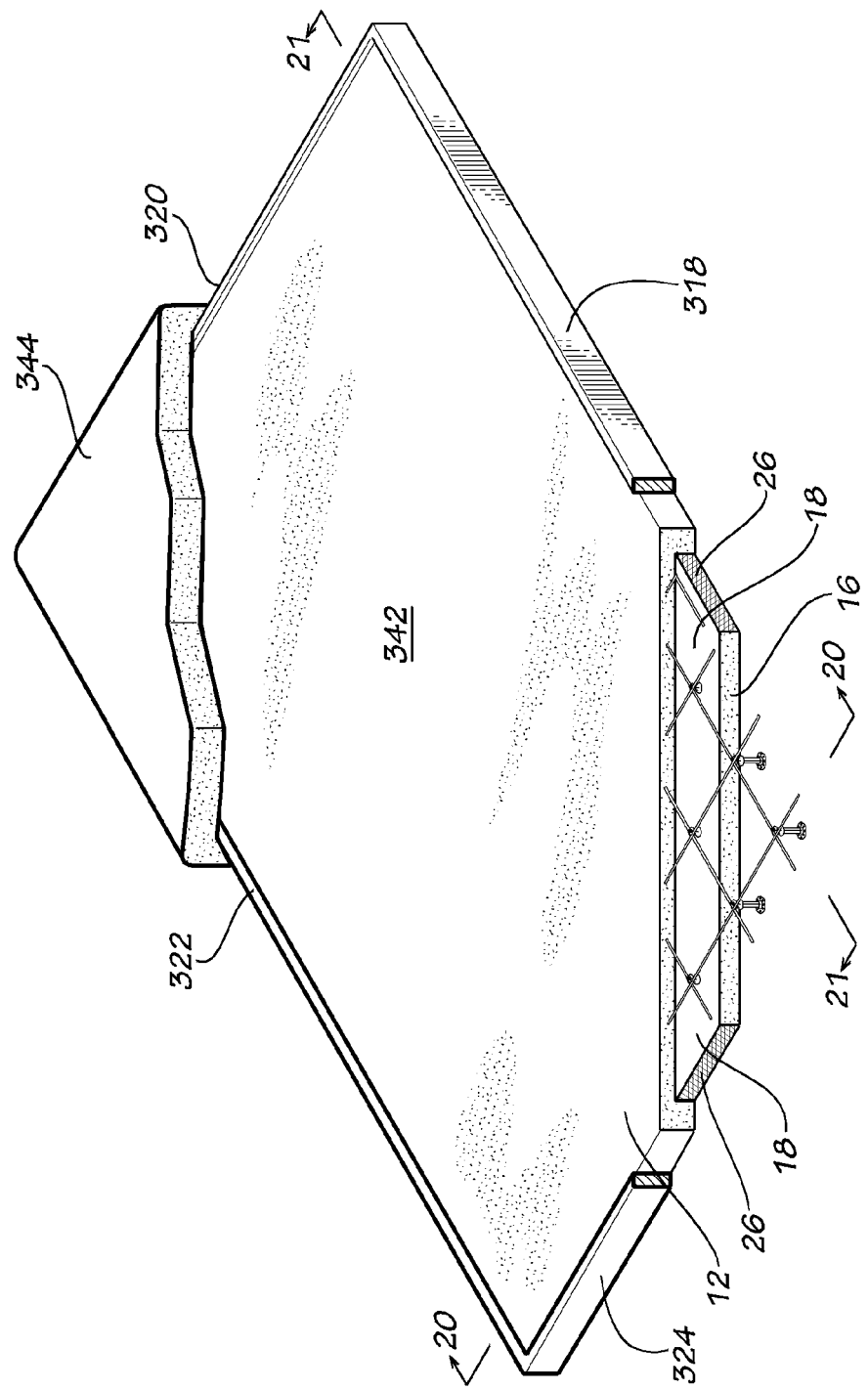
FIG. 19 is a partially broken away perspective view of a disclosed embodiment of a precast concrete wall panel form system in accordance with the present invention showing the formation of an interior structural layer of concrete of a precast infill concrete panel in accordance with a disclosed embodiment of the present invention.
Figure 20:
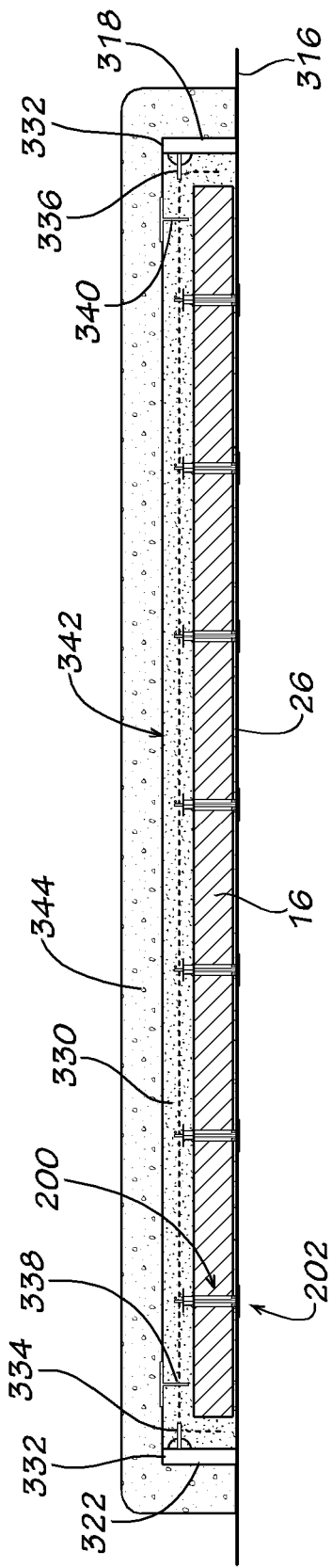
FIG. 20 is a cross-sectional view taken along the line 20-20 of the precast concrete wall panel form system shown in FIG. 19, shown with the optional insulating material positioned over the concrete form.
Figure 21:
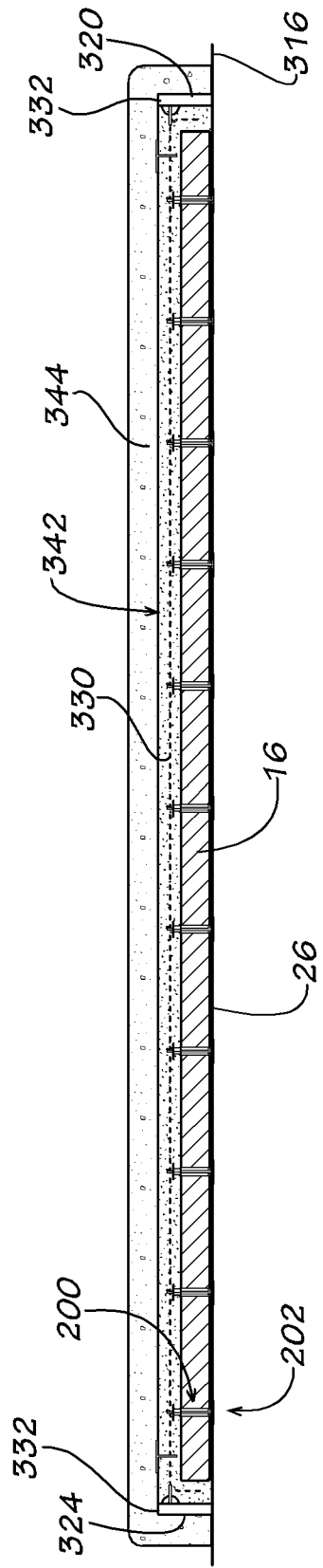
FIG. 21 is a cross-sectional view taken along the line 21-21 of the precast concrete wall panel form system shown in FIG. 19, shown with the optional insulating material positioned over the concrete form.

The precast concrete panel 10 in accordance with the present invention can be cast in either a horizontal or a vertical position. However, the present embodiment will describe a horizontal casting procedure. The foam insulating panel 16 is placed on a flat, horizontal casting surface 316, such as on level ground, on a concrete slab or preferably on a casting table. The foam insulating panel 16 is placed on the casting surface 316 so that the layer of mesh/lath 26 is adjacent the casting surface. Then, a conventional wood or metal form is constructed around the peripheral edges 300-306 of the foam insulating panel 16 such that the form is larger than the foam insulating panel. Specifically, as shown in FIGS. 19-21, a longitudinal form member 318 is disposed adjacent the right longitudinal edge of the foam insulating panel 16, but spaced therefrom. A transverse form member 320 is disposed adjacent the upper transverse exterior edge of the foam insulating panel 16, but spaced therefrom. A longitudinal form member 322 is disposed adjacent the left longitudinal exterior edge of the foam insulating panel 16, but spaced therefrom. And, a transverse form member 324 is disposed adjacent the lower transverse exterior edge of the foam insulating panel 16, but spaced therefrom. The distance that the side frame members 318-324 are spaced from the foam insulating panel 16 is any desired thickness needed for the structural integrity of the interior structural wythe 12, but it would generally be equal or less than the thickness of the interior concrete wythes and as thin as the exterior concrete wythe. The side form members 318-324 are joined together in a manner well known in the art. Although this embodiment has been disclosed as placing the foam insulating panel 16 on the casting surface 316 and then constructing the side form members 318-324, the present invention also contemplates using standardized concrete forming tables or constructing the side form members 318-324 first and then placing the foam insulating panel 16 within the side form members. The height of the side form members 318-324 is selected such that it is equal to the thickness of the foam insulating panel 16 and the layer of mesh/lath 26 plus the desired thickness of the interior structural wythe 12. For example, if the foam insulating panel 16 and layer of mesh/lath 26 are four inches thick and the thickness of the interior structural wythe 12 is to be four inches thick, the side form members 318-324 will be 8 inches high.

If the anchor member/locking caps assemblies 200, 202 are used, each includes a C-shaped clamping member 218. The clamping member is sized and shaped as a rebar chair to receive and retain an elongate round steel rebar, such as the rebar 220 (FIGS. 15-18), in the manner disclosed in applicant's co-pending patent application Ser. No. 13/247,256 filed Sep. 28, 2011 (the disclosure of which is incorporated herein by reference in its entirety). Thus, aligned rows of anchor member/locking caps assemblies 200, 202 provide aligned rows of clamping members, such that additional rows of rebar parallel to the rebar 220 of a desired length can be attached to the rows of anchor member/locking caps assemblies. Crossing columns of rebar, such as the rebar 222 (FIGS. 15-18), are laid on top of the rows of rebar, such as the rebar 220, to form a conventional rebar grid. Where the columns and rows of rebar intersect, such as the rebar 220, 222, the rebar can be tied together with wire ties (not shown) in any conventional manner known in the art. The anchor member/locking caps assemblies 200, 202 are designed such that the distance from the flange 212 to the C-shaped clamping member 218 positions the rebar at approximately the mid-point of the thickness of the interior structural wythe 12. Thus, the anchor member/locking caps assemblies 200, 202 automatically position the rebar grid at the proper depth for the interior structural wythe 12 being constructed, as required by structural design calculations. If either of the anchor members 28, 100 is used, the rebar grid can be constructed in any conventional manner known in the art. Alternatively, welded wire or welded wire mesh (not shown) can be used instead of the rebar grid depending on design requirements. In another disclosed embodiment, the rebar grid can be replaced by wire mesh or carbon fiber mesh, such as made by Chromarat, Anderson, S.C. and sold under the trade name C-Grid. Any other type of concrete reinforcing lath or mesh can be used as deemed suitable for providing concrete reinforcement based on design requirements.

After the rebar grid is constructed, plastic concrete 330 is placed on top of the interior surface 20 of the foam insulating panel 16 and within the side form members 318-324 (FIGS. 15, 16, 19-22). Sufficient plastic concrete 330 is placed in the form such that the plastic concrete in the form reaches the top 332 of the side form members 318-324 (FIGS. 20-21). Embeds and/or inserts are placed in the plastic concrete 330 as needed or desired. For example, FIG. 20 shows two lifting hooks 334, 336 and two embeds 338, 340 in the concrete 330. The top surface 342 of the plastic concrete 330 is then finished in any desired conventional manner, such as by troweling, or to provide other types of architectural finishes or patterns (FIGS. 19-21).

After the plastic concrete 330 in the form has been finished, an insulating material 344 optionally is placed on the top 332 of the side form members 318-324 and the top surface 342 of the finished plastic concrete 330, as shown in FIGS. 19-21. The insulating material 344 can be made from the same material as the foam insulating panel 16, but is preferably a concrete insulating blanket, an electrically heated concrete insulating blanket or an electrically heated concrete form. If the insulating material 344 is made from polystyrene, it preferably is at least 0.5 inches thick; more preferably at least 1 inch thick, especially at least 2 inches thick; more especially at least 3 inches thick; most especially, at least 4 inches thick. If the insulating material 344 is made from expanded polystyrene foam, it preferably is approximately 0.5 inches thick; preferably approximately 1 inch thick; more preferably approximately 2 inches thick; especially approximately 3 inches thick; most especially approximately 4 inches thick. If the insulating material 344 is made from a material other than polystyrene, it should have insulating properties equivalent to at least 0.5 inches of expanded polystyrene foam; preferably approximately 1 inch to approximately 8 inches of expanded polystyrene foam; more preferably at least 1 inch of expanded polystyrene foam; especially at least 2 inches of expanded polystyrene foam; more especially at least 3 inches of expanded polystyrene foam; most especially, at least 4 inches of expanded polystyrene foam. If the insulating material 344 is made from a material other than expanded polystyrene foam, it should have insulating properties equivalent to approximately 0.5 inch thick of expanded polystyrene; approximately 1 inch thick; preferably approximately 2 inches thick; especially approximately 3 inches thick; most especially approximately 4 inches thick. Expanded polystyrene foam has an R-value of approximately 4 to 5 per inch thickness. Therefore, the insulating material 344 should have an R-value of greater than 1.5, greater than 4, preferably greater than 10, more preferably greater than 15, especially greater than 20. The insulating material 344 preferably has an R-value of approximately 5 to approximately 40; more preferably between approximately 10 to approximately 40; especially approximately 15 to approximately 40; more especially approximately 20 to approximately 40. The insulating material 344 preferably has an R-value of approximately 5, more preferably approximately 10, especially approximately 15, most preferably approximately 20.

If the insulating material 344 is an electrically heated concrete blanket or an electrically heated concrete form, it should be designed and operated in the same manner as the electrically heated blanket and the electrically heated concrete form disclosed in U.S. Pat. No. 8,532,815 (the disclosure of which is incorporated herein by reference in its entirety). Thus, if an electrically heated concrete blanket or an electrically heated concrete form is used for the insulating material 344, the interior structural wythe 12 is preferably cured according to a predetermined temperature profile, in the manner disclosed in U.S. Pat. No. 8,532,815 (the disclosure of which is incorporated herein by reference in its entirety).

The insulating material 344 can also be made from a refractory insulating material, such as a refractory blanket or a refractory board. Refractory insulating material is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, and fireclay. Refractory insulating material is commercially available in bulk fiber, foam, blanket, board, felt and paper form. Refractory insulation is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC, Niagara Falls, N.Y., USA and CS85, Marinite and Transite boards from BNZ Materials Inc., Littleton, Colo., USA. The refractory insulating material can be any thickness that provides the desired insulating properties, as set forth above. There is no upper limit on the thickness of the refractory insulating material; this is usually dictated by economics and ease of handling. However, refractory insulating material useful in the present invention can range from $1/32$ inch to approximately 2 inches.

The objective of the foregoing embodiments of the present invention is optionally to insulate the plastic concrete 330 as completely as possible; i.e., on all sides. As can be seen in FIGS. 20 and 21, the plastic concrete 330 is insulated on both the top and the bottom and on all sides. Thus, the plastic concrete 330 is completely encased or surrounded in insulating material by the foam insulating panel 16 and the insulating material 344. Of course, for certain applications, it may be desirable to omit the use of the insulating material 344. This is to cure the concrete according to the curing methods described in U.S. Pat. No. 8,545,749 (the disclosure of which is incorporated herein by reference in its entirety), for improved concrete performance and for use with all the other types of concrete mixes described in said applications.

The uncured concrete 330 is kept in the form for a time sufficient for the concrete to achieve sufficient strength, such as sufficient compressive strength, so that the partially cured concrete panel can be inverted without breaking, suffering structural damage or cracking. The time necessary for the uncured concrete 330 to achieve a desired amount or degree of cure will vary depending on many factors, including the type of concrete mix used, ambient temperatures, thickness of the concrete, and the like. However, the uncured concrete 330 will generally achieve sufficient strength within approximately four hours to seven days. By using the insulating material 344 (or electrically heated insulating blanket or electrically heated concrete form) in accordance with the present invention, the uncured concrete 330 in the form will cure faster and will achieve early strength more quickly than prior art systems. The insulating material 344 (or electrically heated insulating blanket or electrically heated concrete form) in accordance with the present invention also results in less plastic concrete shrinkage, thereby reducing cracking of the finished concrete. These benefits make the precast concrete panel in accordance with the present invention stronger and allow the panel to be inverted earlier than prior art systems. By retaining the water in the concrete mix within the insulated concrete form and since that space is insulated by the insulating material 344 and the foam insulating panel 16, the heat of hydration of the curing concrete is retained within the insulated concrete form and sufficient water is present such that the concrete will achieve its maximum potential strength faster, thereby producing stronger concrete (in terms of both early strength and ultimate strength).

Figure 22:
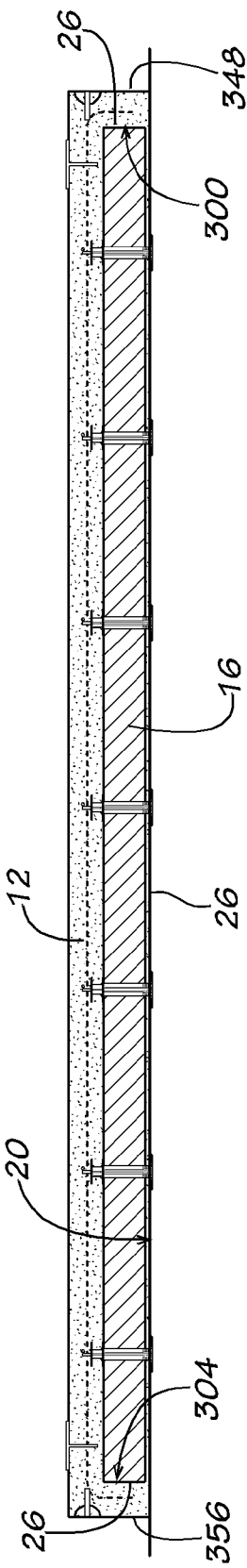
FIG. 22 is a cross-sectional view taken along the line 20-20 of the precast concrete wall panel form system shown in FIG. 19, shown with the forming and curing system removed.
Figure 23:
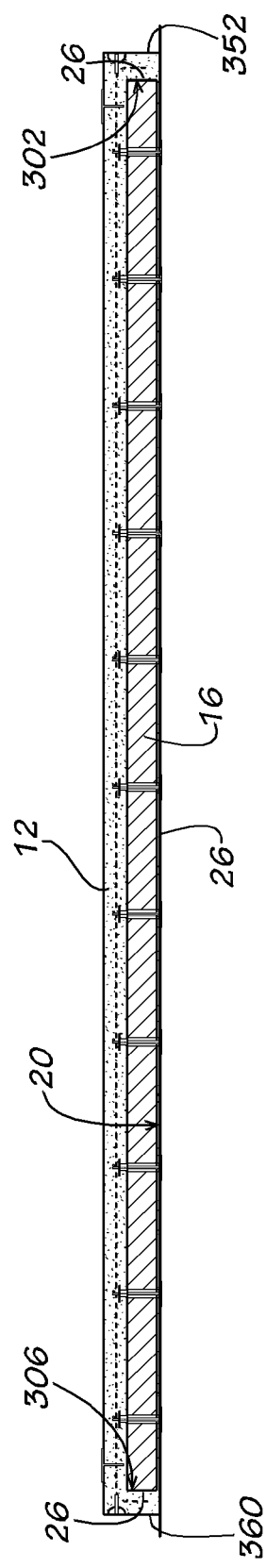
FIG. 23 is a cross-sectional view taken along the line 21-21 of the precast concrete wall panel form system shown in FIG. 19, shown with the forming and curing system removed.

After the uncured concrete 330 has achieved a desired amount or degree of cure, the insulating material 344 is removed, if present, and the side form members 318-324 are removed (FIGS. 22 and 23). Since the concrete 330 is at lease partially cured, the panel anchor members, such as the panel anchor members 28, 100 or the panel anchor member 200, are securely anchored in the concrete 330. The foam insulating panel 16 is therefore securely attached to the interior structural wythe 12, both by the panel anchors members 28, 100, 200 and by an adhesive bond between the interior surface 18 of the foam insulating panel and interior structural wythe 12; i.e., as the uncured concrete 330 cures, it forms a strong adhesive bond with the interior surface 18 of the foam insulating panel 16. Thus, the interior structural wythe 12 is both mechanically attached to the foam insulating panel 16 by the panel anchor members 28, 100, 200 and physically attached by the adhesive bond of the concrete across the entire surface 18 of the foam insulating panel. This large surface area provides a substantial and strong connection between the foam insulating panel 16 and the interior structural wythe 12. If a layer of radiant heat reflective material 22 is used on the interior surface 18 of the foam insulating panel 16, as shown in FIGS. 6-7 and 13-14, the layer of radiant heat reflective material is optionally, but preferably, perforated so that plastic concrete 330 can at least partially penetrate through the layer of heat reflective material and form an adhesive bond between the foam insulating panel 16 and the interior structural wythe 12.

Precast plants make use of steam curing rooms. In one disclosed embodiment, the insulating material 344 can be kept in place for only a sufficient amount of time for the concrete to achieve the necessary amount of hardness before it can be stripped from the form or mold and moved into a conventional steam curing room. Since there is no bond between the bottom of the foam panel and the casting surface (table) it sits on, the concrete panel can be easily moved and stored on shelves in a steam curing room until it has achieved the necessary hydration and strength. Since only the side forms elements have to be stripped from the entire concrete assembly, it can easily be moved on a conveyor belt system from the casting area into the steam curing area. The casting and curing area can be efficiently integrated with a conveyor, delivery and steam curing storage area.

Figure 24:
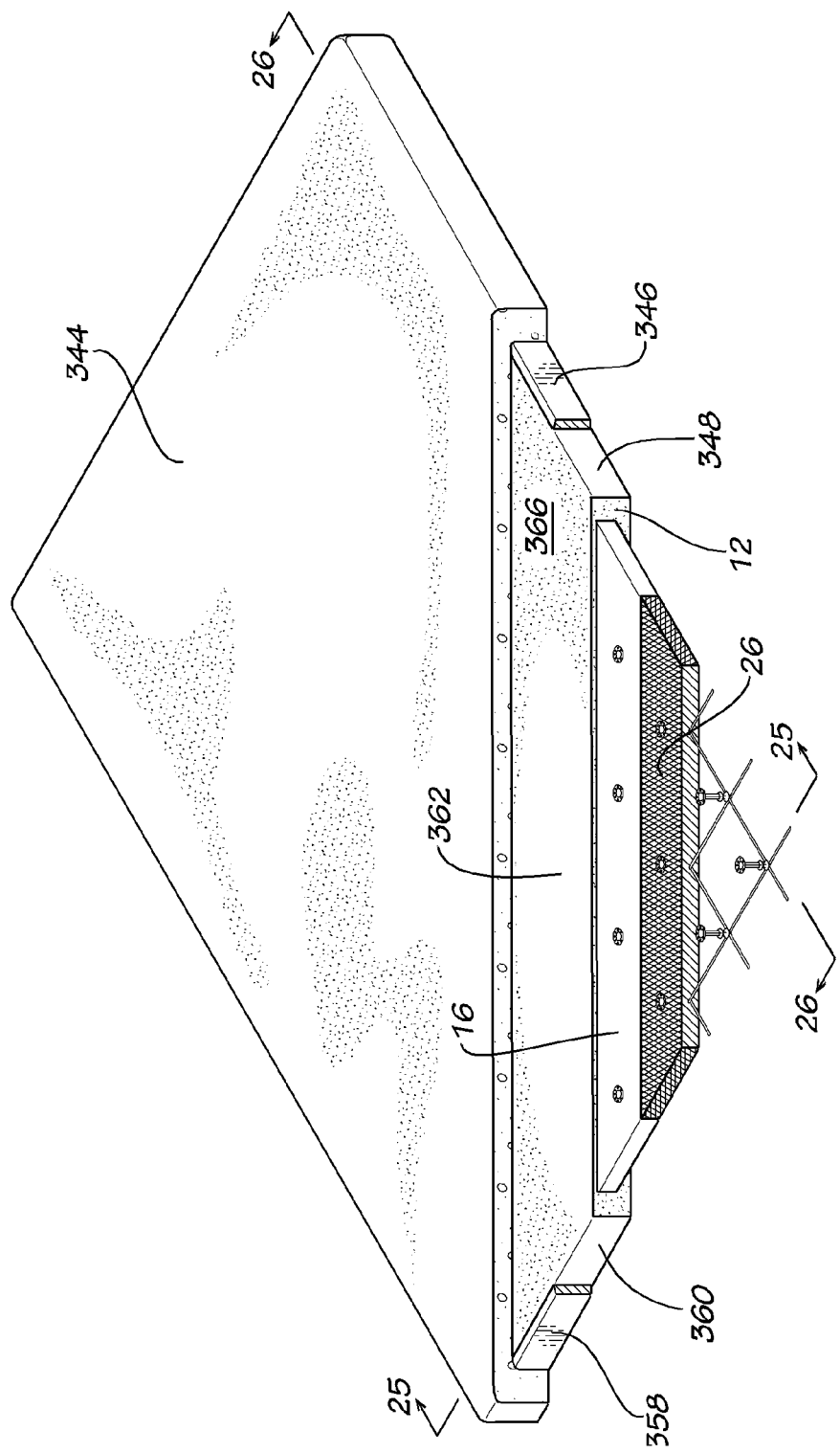
FIG. 24 is a partially broken away perspective view of a disclosed embodiment of a precast concrete wall panel form system in accordance with the present invention showing the formation of an exterior non-structural layer of concrete, plaster or mortar of a precast infill concrete panel in accordance with a disclosed embodiment of the present invention.
Figure 25:
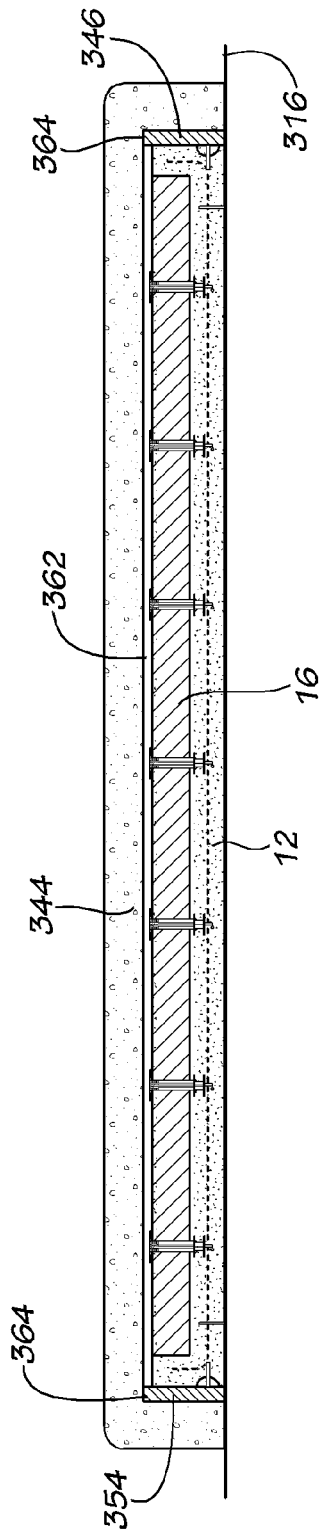
FIG. 25 is a cross-sectional view taken along the line 25-25 of the precast concrete wall panel form system shown in FIG. 24, shown with the optional insulating material positioned over the concrete form.
Figure 26:
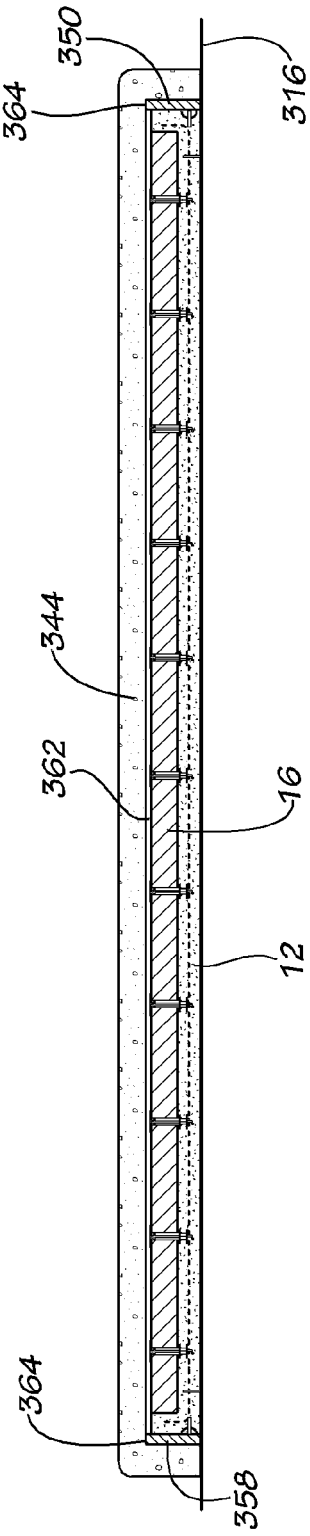
FIG. 26 is a cross-sectional view taken along the line 26-26 of the precast concrete wall panel form system shown in FIG. 24, shown with the optional insulating material positioned over the concrete form.

When uncured concrete 330 is cured it becomes the interior concrete Whyte 12. Thus, when the interior concrete wythe 12 has achieved sufficient strength, the panel 10 is then inverted so that the interior structural wythe 12 is resting on the casting surface 316 and the layer of mesh/lath 26 is facing upward, as shown in FIGS. 24-26. The concrete panel 10 is inverted using techniques and apparatus that are well known in the art.

The exterior non-structural wythe 14 is then applied by various means, such as by spraying, hand troweling, dry casting, wet casting or by extrusion to the necessary thickness, depending on the material and the thickness of the exterior non-structural wythe. The exterior non-structural wythe 14 can be made of conventional concrete, mortar, stucco, synthetic stucco, plaster or any other cementitious material, cementitious polymer modified material or polymer coatings. It can be painted or have an integrated color pigment and/or it can have any type of architectural texture or color finish. To provide greater flexural strength and impact resistance, a particularly preferred material is polymer modified concrete, cement plaster, geopolymer or mortar. Polymer modified concrete, cement plaster, geopolymer or mortar is known in the art and comprises a conventional concrete, plaster or mortar mix to which a polymer is added in a polymer to cement ratio of 0% to 25% by weight, preferably approximately 5% to approximately 20% by weight. Polymers suitable for addition to concrete, plaster or mortar mixes come in many different types: thermoplastic polymers, thermosetting polymers, elastomeric polymers, latex polymers and redispersible polymer powders. Latex polymers can be classified as thermoplastic polymers or elastomeric polymers. Latex thermoplastic polymers include, but are not limited to, poly(styrene-butyl acrylate); vinyl acetate-type copolymers; e.g., poly(ethyl-vinyl acetate) (EVA); polyacrylic ester (PAE); polyvinyl acetate (PVAC); and polyvinylidene chloride (PVDC). Latex elastomeric polymers include, but are not limited to, styrene-butadiene rubber (SBR); nitrile butadiene rubber (NBR); natural rubber (NR); polychloroprene rubber (CR) or Neoprene; polyvinyl alcohol; and methyl cellulose. Redispersible polymer powders can also be classified as thermoplastic polymers or elastomeric polymers. Redispersible thermoplastic polymer powders include, but are not limited to, polyacrylic ester (PAE); e.g., poly(methyl methacrylate-butyl acrylate); poly(styrene-acrylic ester) (SAE); poly(vinyl acetate-vinyl versatate) (VA/VeoVa); and poly(ethylene-vinyl acetate) (EVA). Redispersible elastomeric polymer powders include, but are not limited to, styrene-butadiene rubber (SBR). Preferred polymers for modifying the concrete, plaster or mortar mixes of the present invention are polycarboxylates. A particularly preferred polymer modified concrete, plaster or mortar for use as the exterior non-structural wythe 14 is disclosed in U.S. Pat. No. 7,714,058 (the disclosure of which is incorporated herein by reference in its entirety). Geopolymers are generally formed by reaction of an aluminosilicate powder with an alkaline silicate solution at roughly ambient conditions. Metakaolin is a commonly used starting material for synthesis of geopolymers, and is generated by thermal activation of kaolinite clay. Geopolymers can also be made from sources of pozzolanic materials, such as lava, fly ash from coal, slag, rice husk ash and combinations thereof.

For relatively thin exterior non-structural wythes 14 made from relatively light material, such a polymer, for example an acrylic polymer base coat; polymer modified concrete; cement plaster; geopolymer or mortar, the exterior non-structural wythe can be applied with the panel 10 in a vertical orientation. This can be done by raising the interior structural wythe 12 and attached foam insulating panel 16, such as shown in FIGS. 22 and 23, to a vertical orientation. The exterior non-structural wythes 14 can then be applied to the exterior surface 20 of the foam insulating panel 16 and the layer of mesh/lath 26 by any suitable method, such as by spraying, by hand troweling or by extrusion. For example, a polymer, for example an acrylic polymer base coat; polymer modified concrete; cement plaster; geopolymer or mortar is applied to the exterior surface 20 of the foam insulating panel 16 and the layer of mesh/lath 26 by spraying to a desired thickness, such as approximately ⅛ inch to approximately 2 inches; preferably approximately ⅛, preferably approximately ¼ inch, preferably approximately 0.5 inches, preferably approximately 0.75 inches, preferably approximately 1 inch, preferably approximately 1.25 inches, preferably approximately 1.5 inches, preferably approximately 1.75 inches and preferably approximately 2 inches. The polymer modified concrete, cement plaster, geopolymer or mortar is preferably applied to the exterior surface 20 of the foam insulating panel 16 and the layer of mesh/lath 26 by extrusion to a desired thickness, preferably approximately ⅛ inch to approximately 1.75 inches. Other suitable coatings for use as the thin exterior non-structural wythes 14 include, but are not limited to, a cementitious or an acrylic EIFS base coat, such as Parex 121 base coat mixed with portland cement (or dry bag version); a 100% acrylic polymer base coat, such as Parex ABC-N1 base coat; a color integrated acrylic finish coat, such as Parex DPR acrylic finish coat; a multicolor finish made of colored beads mixed with a clear polymer binder, such as Parex Cerastone or any type of finish coating, such as Parex Specialty finishes.

The sprayed or extruded polymer, polymer modified concrete, cement plaster, geopolymer or mortar on the foam insulating panel 16 and the layer of mesh/lath 26 is then smoothed with a hand trowel to form an even, smooth surface for the exterior non-structural wythe 14 or left in it's natural extrusion state. The exterior non-structural wythe 14 is then allowed to cure sufficiently so that the panel 10 can be moved without causing cracking or damage to the exterior non-structural wythe 14. If acceleration of the curing process is desired or needed, the exterior non-structural wythe 14 is wrapped with insulating material, as described above. Alternatively, the exterior non-structural wythe 14 is enclosed by an electrically heated concrete blanket or by an electrically heated concrete form and the exterior non-structural wythe is cured according to a predetermined temperature profile, in the manner disclosed in U.S. Pat. No. 8,532,815 (the disclosure of which is incorporated herein by reference in its entirety). Similarly, the entire assembly can be placed inside a steam curing room, as previously described.

If a thicker and/or heavier coating or material is used for the exterior non-structural wythe 14, the panel 10 is then inverted from the position shown in FIGS. 19-23 to the position shown in FIGS. 24-27, so that the interior structural wythe 12 is resting on the casting surface 316 and the mesh/lath 26 is facing upward, as shown in FIG. 24. The concrete panel 10 is inverted using techniques and apparatus that are well known in the art.

New side form members are then constructed around the concrete panel 10. As shown in FIGS. 24-26, the side form members comprise a longitudinal form member 346 is disposed adjacent the right longitudinal edge 348 of the interior structural wythe 12. A transverse form member 350 is disposed adjacent the upper transverse exterior edge 352 of the interior structural wythe 12. A longitudinal form member 354 is disposed adjacent the left longitudinal exterior edge 356 of the interior structural wythe 12. And, a transverse form member 358 is disposed adjacent the lower transverse exterior edge 360 of the interior structural wythe 12. The side form members 346, 350, 354, 358 are joined together in a manner well known in the art. The side form members 346, 350, 354, 358 are of a height greater than the thickness of the interior structural wythe 12, the foam insulating panel 16, the layer of mesh/lath 20, and the radiant heat reflective material 24, if used. Thus, when plastic concrete 362 (or other materials as described above) is placed on the foam insulating panel 16, sufficient plastic concrete is placed in the form such that the plastic concrete reaches the top 364 of the side form members 346, 350, 354, 358. The plastic concrete 362 also permeates the layer of mesh/lath 26. Since the layer of mesh/lath 26 is held in place by the anchor member 28, 100 or by the anchor member/ locking cap assembly 200, 202, the concrete 362 will be held in place by the layer of mesh/lath. Also, since the plastic concrete 362 permeates the layer of mesh/lath 26, there is also adhesion between the plastic concrete (after it has cured and becomes the exterior non-structural wythe 14) and the foam insulating panel 16, as described above. If the radiant heat reflective material 24 is used, it may be desirable to perforate the radiant heat reflective material so that the plastic concrete 362 at least partially penetrates the radiant heat reflective material 24 thereby providing an adhesive bond between the exterior non-structural wythe 14 and the foam insulating panel 16. The top surface 366 of the plastic concrete 362 is then finished in any desired conventional manner, such as by troweling, or to provide other types of architectural finishes or patterns. Similarly, the exterior non-structural wythe's 14 surface 366 can be acid washed, or finished by any other known method, to expose the aggregate in the same fashion as conventional architectural precast panels know in the art to provide a desired textured effect.

The thickness of the concrete 362, which forms the exterior non-structural wythe 14, is thinner than the interior structural wythe 12 (concrete 230). The exterior non-structural wythe 14 is less than 50% the thickness of the interior structural wythe 12; preferably, less than 25% the thickness of the interior structural wythe; more preferably, less than 10% the thickness of the interior structural wythe; most preferably, less than 5% the thickness of the interior structural wythe. The exterior non-structural wythe 14 preferably has a thickness of about 0.125 inches to less than 2 inches. Specifically, the interior structural wythe 12 can be about 2 inches thick, about 3 inches thick, about 4 inches thick, about 5 inches thick, about 6 inches thick, about 7 inches thick, or about 8 inches thick. The exterior non-structural wythe 14 preferably has a thickness of about 0.125 inches to less than 2 inches. Specifically, the exterior non-structural wythe 14 can be about 0.125 inches thick, about 0.25 inches thick, about 0.5 inches thick, about 0.75 inches thick, about 1 inches thick, about 1.25 inches thick, about 1.5 inches thick, or about 1.75 inches thick. Since the exterior non-structural wythe 14 is much thinner than the interior structural wythe 12, the overall weight of the insulated concrete panel 10 is much less than conventional concrete panels. It also eliminates the need for strong ties between the interior and exterior wythes, such as required in the T-Mass and the Carboncast concrete panels. By using a relatively thin, lightweight layer for the exterior non-structural wythe 12, a bond breaker between the foam insulating panel 16 and each concrete layer 12, 14 is not required. In fact, it is specifically contemplated as a part of the present invention that an adhesive bond is formed between the interior structural wythe 12 and the foam insulating panel 16 and the exterior non-structural wythe 14 and the foam insulating panel. Also, the bond between both the interior and exterior wythes 12, 14 and the foam insulating panel 16, in conjunction with the mechanical connection provided by the anchor members 28, 100, 200 and the layer of mesh/lath 26, which connects the interior and exterior wythes, create a much stronger composite panel. Furthermore, since the exterior wythe 14 is so thin, the thermal mass is relatively small which makes the overall energy efficiency of the composite insulated concrete panel 10 far greater than prior art concrete panels. Furthermore, if the anchor member 100 is used, the notch 118 becomes embedded in the exterior non-structural wythe 14, thereby providing a strong mechanical connection between the interior and exterior wythes 12, 14 and the foam insulating panel 16. Also, by using the polymer modified concrete, cement plaster, geopolymer or mortar, the exterior non-structural Whyte 14 can have far greater flexural strength without developing cracks or damage. Use of polymer modified concrete, polymer modified cement plaster, geopolymer or mortar withstands far greater flexural stresses, and it eliminates the internal reinforcing and prestressed cables associated with the other types of sandwich panels. Yet another benefit of using a polymer modified concrete, polymer modified cement plaster, polymer modified stucco, geopolymer or mortar is the alkalinity of the cementitious material is reduced compared to conventional concrete which allows for use of lath and meshes made from various mineral or synthetic fibers as reinforcement for the exterior architectural thin non-structural Whyte 14. All of the foregoing effectively reduces the thickness of the exterior wythe to a minimum possible thickness, as required by specific applications and budgets.

After the plastic concrete 362 in the form has been finished, an insulating material 344 optionally is placed on the top 364 of the side form members 346, 350, 354, 358 and the top surface 366 of the finished plastic concrete 362, as shown in FIGS. 24-26. Thus, if an electrically heated concrete blanket or an electrically heated concrete form is used for the insulating material 344, the exterior non-structural wythe 14 (concrete 362) is preferably cured according to a predetermined temperature profile, in the manner disclosed in U.S. Pat. No. 8,532,815 (the disclosure of which is incorporated herein by reference in its entirety).

The concrete 362 is kept in the form (if cast) for a time sufficient for the concrete to achieve a desired amount of cure. If the concrete 362 is sprayed, hand troweled or extruded, then no form is necessary. When sprayed, hand troweled or extruded, the panel can be horizontal or vertical depending on available space and preference. If other types of materials are used, such as polymer modified concrete, polymer modified cement plaster, polymer modified stucco, acrylic base coat and finishes, geopolymer or mortar or polymers, there may be no need to keep the material under the insulating material 344. The time necessary for the polymer modified concrete, polymer modified cement plaster, geopolymer or mortar 362 to achieve a desired amount or degree of cure will vary depending on many factors, including the material used, the type of concrete mix used, ambient temperatures, thickness of the concrete, and the like. However, the concrete 362 will generally achieve sufficient strength within approximately one hour to seven days. By using the insulating material 344 (or the electrically heated insulating blanket or electrically heated form) in accordance with the present invention, the concrete, plaster or mortar in the form will set faster and hydrate faster and will achieve early concrete, plaster or mortar strength more quickly than prior art systems. The electrically heated blanket or electrically heated form in accordance with the present invention also results in less plastic concrete, plaster or mortar shrinkage, thereby reducing cracking of the finished concrete, plaster or mortar. Using a steam curing room has a similar effect on the curing of the polymer modified concrete, cement plaster, geopolymer or mortar as any of the other enhanced curing systems and methods mentioned above. These benefits make the precast concrete panel in accordance with the present invention stronger and allow the panel to be used earlier than prior art systems. By retaining the water in the concrete mix within the insulated concrete form and since that space is insulated by the foam insulating panel 16 and insulating material 344, the heat of hydration is retained within the insulated concrete form such that the concrete, plaster or mortar mix will achieve its maximum potential strength and rigidity earlier and faster, thereby producing a stronger concrete in-fill panel.

Figure 27:
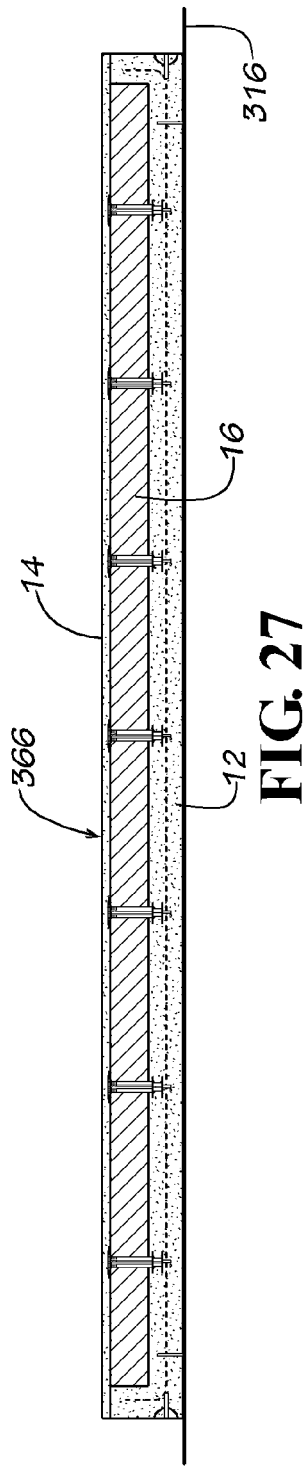
FIG. 27 is a cross-sectional view taken along the line 25-25 of the precast concrete wall panel form system shown in FIG. 15, shown with the optional insulating material and side form members removed.
Figure 28:
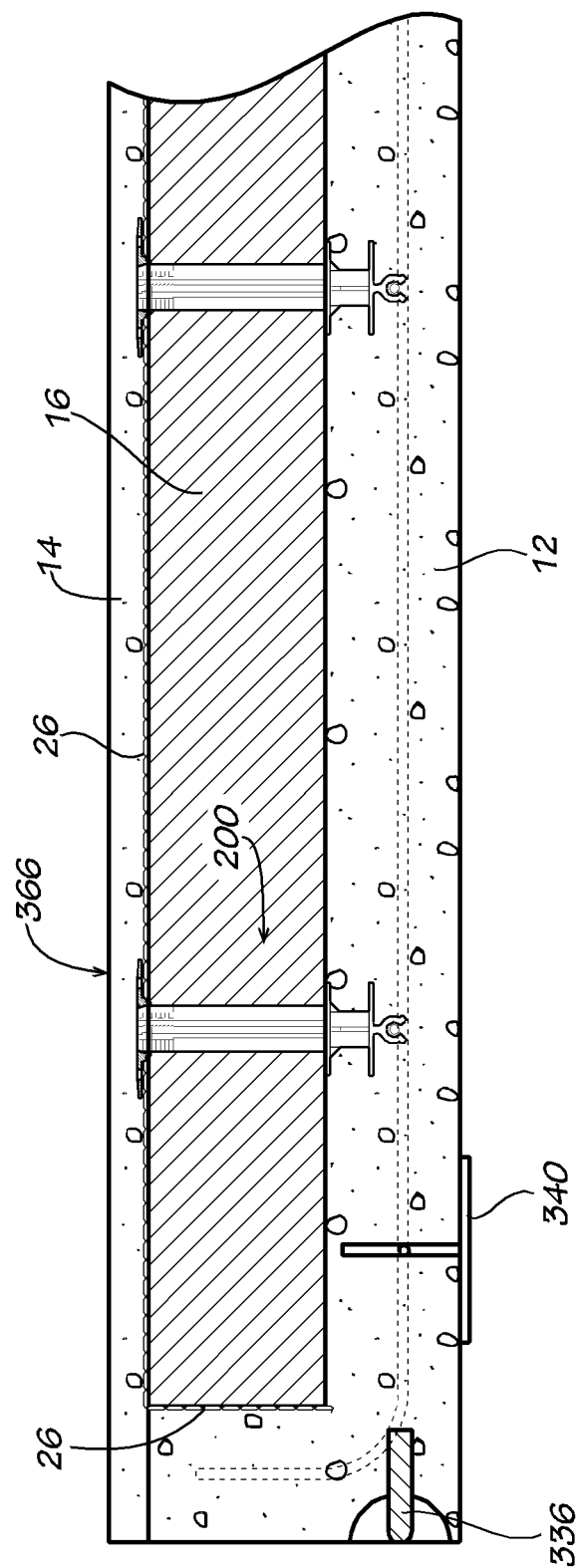
FIG. 28 is a partial detail cross-sectional view of the precast concrete wall panel shown in FIG. 27.

After the concrete 362 has achieved a desired amount or degree of cure, the insulating material 344 is removed, if present, and the side form members 346, 350, 354, 358 are removed, if present, as shown in FIGS. 27-28. The concrete panel 10 is then ready to use.

Figure 29:
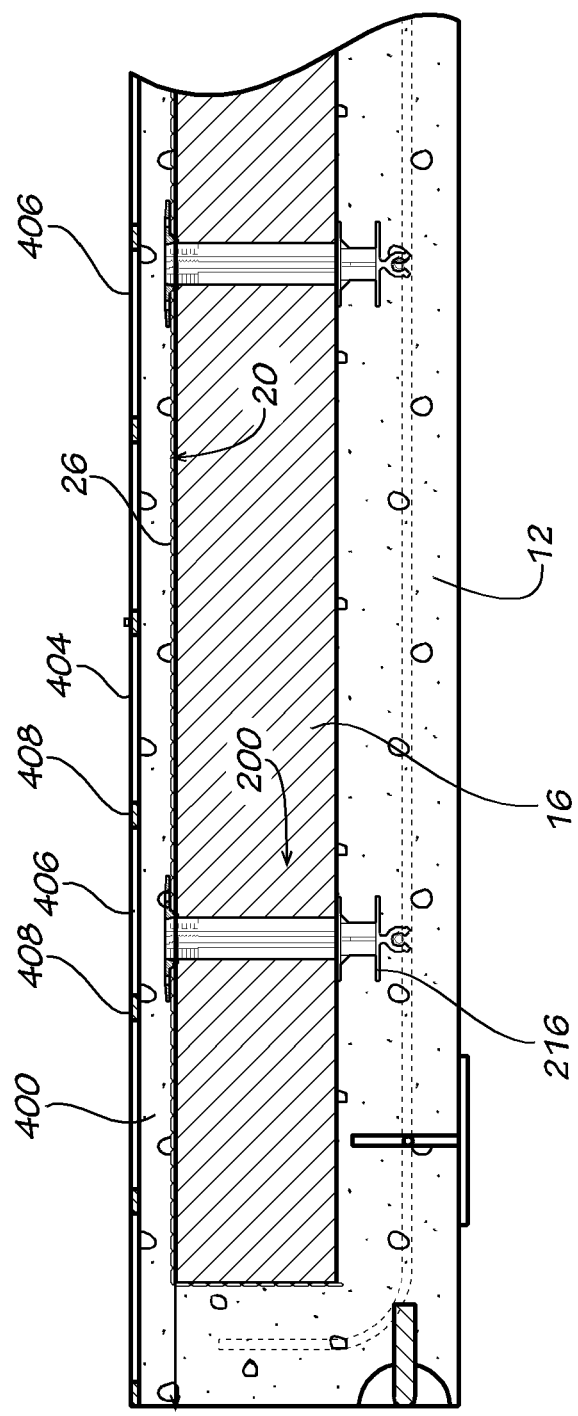
FIG. 29 is a cross-sectional side view of another disclosed embodiment of the precast infill concrete panel shown in FIG. 27, showing the use of a mask or template to form a second layer on the exterior non-structural layer of concrete, plaster or mortar.
Figure 30:
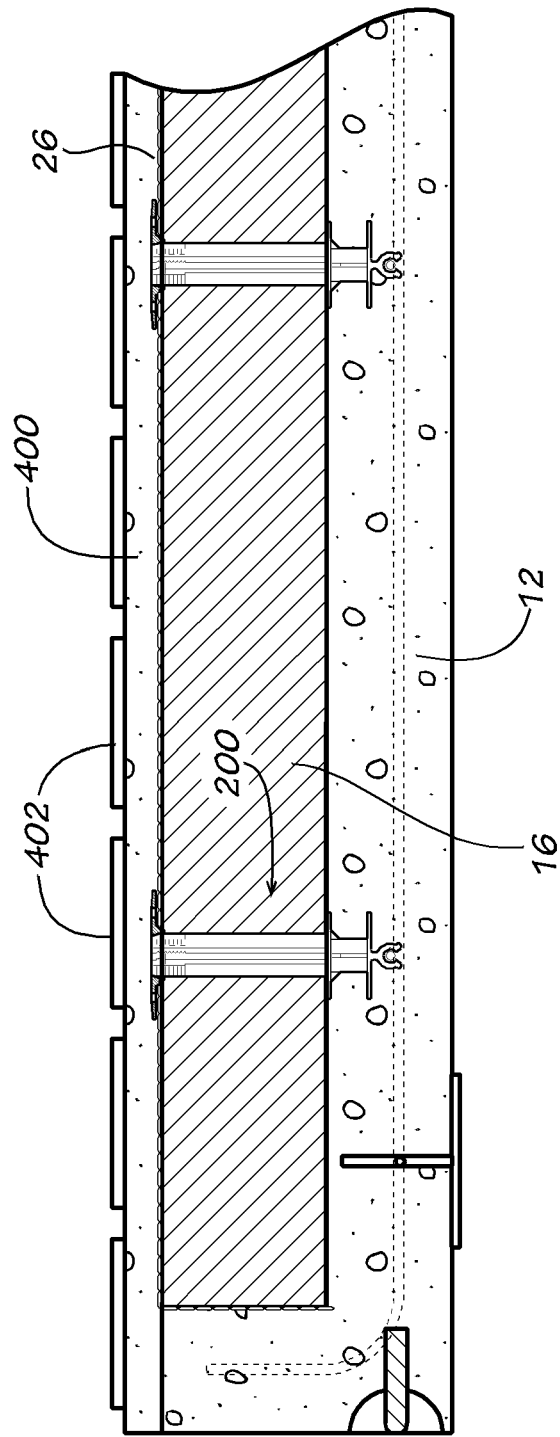
FIG. 30 is a cross-sectional side view of the precast infill concrete panel shown in FIG. 29, showing the mask or template removed and a second layer of concrete plaster or mortar formed on the exterior non-structural layer of concrete, plaster or mortar to provide a desired patterned surface thereon.
Figure 31:
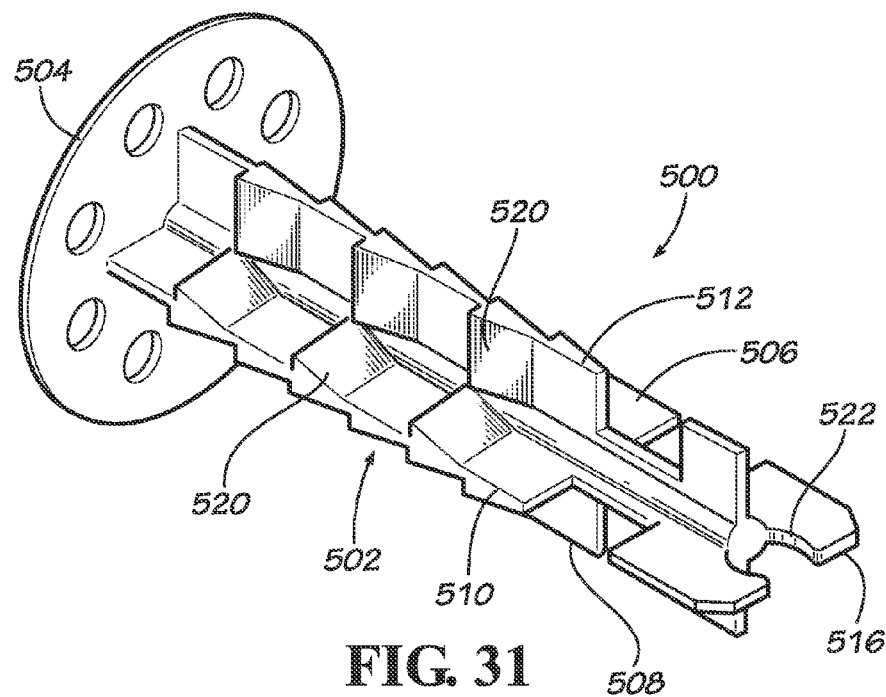
FIG. 31 is a perspective view of another disclosed embodiment of a panel anchor member in accordance with the present invention.

In an alternative disclosed embodiment (FIGS. 29-30), the concrete panel 10 is constructed as described above with respect to FIGS. 19-28; however, the interior structural wythe 12 is made from a single layer of concrete, polymer modified concrete, polymer modified cement plaster, stucco, geopolymer or mortar and the exterior non-structural wythe 14 is formed from two layers of polymer modified concrete, plaster or mortar (FIG. 30). A first layer 400 of polymer modified concrete, plaster or mortar is applied to the exterior surface 20 of the foam insulating panel 16 and layer of mesh/lath 26, if present, in the manner described above. This first layer 400 of polymer modified concrete, polymer modified plaster or mortar can be applied by any suitable method, such as by spraying, hand trowelling or by extrusion. This first layer 400 of polymer modified concrete, plaster or mortar preferably has a thickness of approximately ⅛ inch to approximately 1 inch, most preferably approximately 0.25 inches to approximately 0.5 inches. A second layer 402 of polymer modified concrete, plaster or mortar is then selectively applied to the first layer 400 of polymer modified concrete, plaster or mortar. The second layer 402 of polymer modified concrete, plaster or mortar is preferably applied to the first layer 400 of polymer modified concrete, plaster or mortar by spraying. The second layer 402 of polymer modified concrete, plaster or mortar is preferably selectively applied to the first layer 400 of polymer modified concrete, plaster or mortar by applying a mask or template 404 to the first layer 400 of polymer modified concrete, plaster or mortar before the second layer 402 of polymer modified concrete, plaster or mortar is applied thereto. The mask or template 404 (FIG. 29) allows the second layer 402 of polymer modified concrete, plaster or mortar to be applied to desired portions of the first layer 400 of polymer modified concrete, plaster or mortar and not to other portions of the first layer of polymer modified concrete, plaster or mortar. The mask or template 404 is therefore made in a desired pattern or shape. For example, a mask or template 404 for a simulated brick wall would have openings 406 where the simulated brick is to be formed and solid material 408 where the mortar joints between adjacent brick are to be formed.

After the second layer 402 of polymer modified concrete, plaster or mortar is selectively applied to the first layer 400 of polymer modified concrete, plaster or mortar, the mask or template 404 is removed thereby leaving raised areas of the second layer 402 of polymer modified concrete, plaster or mortar on selected portions of the first layer of polymer modified concrete, plaster or mortar, which form simulated bricks and mortar joints (FIG. 30). Of course, different coloring agents can be included in the first and second layers 400, 402 of polymer modified concrete, plaster or mortar to provide color contrast between the two layers. For example, the first layer 400 of polymer modified concrete, plaster or mortar can be colored beige or gray to simulate mortar joints and the second layer 402 of polymer modified concrete, plaster or mortar can be colored red to simulate red brick. This second layer 402 of polymer modified concrete, plaster or mortar preferably has a thickness of approximately ⅛ inch to approximately 1 inch, most preferably approximately 0.25 inches to approximately 0.5 inches. This method of forming a desired raised pattern of brick, tile or stone on the exterior non-structural wythe 14 is a relatively inexpensive and a relatively lightweight way to form an in-fill concrete panel having a desired pattern or shape, such as simulated brick, limestone, granite, marble or the like thereon. It should be noted that if a panel anchor member, such as the panel anchor member 200, is used the flange 216 should be embedded in the first layer 400 of polymer modified concrete, polymer modified cement plaster, stucco, geopolymer or mortar, but not in the second layer 402 of polymer modified concrete, plaster or mortar (FIG. 30).

In an alternative disclosed embodiment, the composite insulated concrete panel is constructed as described above with respect to FIGS. 19-28; however, no panel anchor members, such as the panel anchor members 28, 100 or the panel anchor member 200, are used and no layer of mesh/lath 26 is used. The interior structural wythe 12 is formed directly on the interior primary surface 18 of the foam insulating panel 16, as described above. As a part of the present invention, it has been discovered that the concrete, plaster or mortar from which the interior structural wythe 12 forms a sufficiently strong adhesive bond with the foam insulating panel that it can support the weight of the foam insulating panel and exterior non-structural wythe 14 without the panel anchor members, such as the panel anchor members 28, 100 or the panel anchor member 200, and without the layer of mesh/lath 26. Furthermore, the exterior non-structural wythe 14 also forms a sufficiently strong adhesive bond with the foam insulating panel 16 that it can support the weight of the exterior non-structural wythe. This is particularly true when the exterior non-structural wythe 14 is made from a polymer modified concrete, polymer modified cement plaster, geopolymer or mortar, as described above, and the thickness of the exterior non-structural wythe is not more than 2 inches, preferably not more than 1 inch, most preferably approximately 0.25 inches to approximately 0.5 inches. Additionally, it is preferred that the concrete, plaster or mortar mix from which the exterior non-structural wythe 14 is made include slag cement, or slag cement and fly ash, and reduced amounts of portland cement, or elimination of portland cement, as described below. Also, it is preferred that the interior structural wythe 12 be cured using the insulating material 344 (or heated concrete blanket or heated concrete form), as described above, or in a steam curing room. It is especially preferred that the interior structural wythe 12 be cured in accordance with a predetermined temperature profile, as described above.

In FIGS. 31-34 there is shown an alternate disclosed embodiment of the panel anchor member 500. The panel anchor member 500 can be used in the same manner as the panel anchor member 28 described above. The foam insulating panel 16 includes a plurality of panel anchor members, such as the panel anchor member 500. Each panel anchor member 500 is preferably formed from a polymeric material, such as polyethylene, polypropylene, nylon, glass filled thermoplastics or the like. For particularly large or heavy structures, the panel anchor member 500 is preferably formed from glass filled nylon. The panel anchor member 500 can be formed by any suitable process, such as by injection molding or pultrusion.

Figure 33:
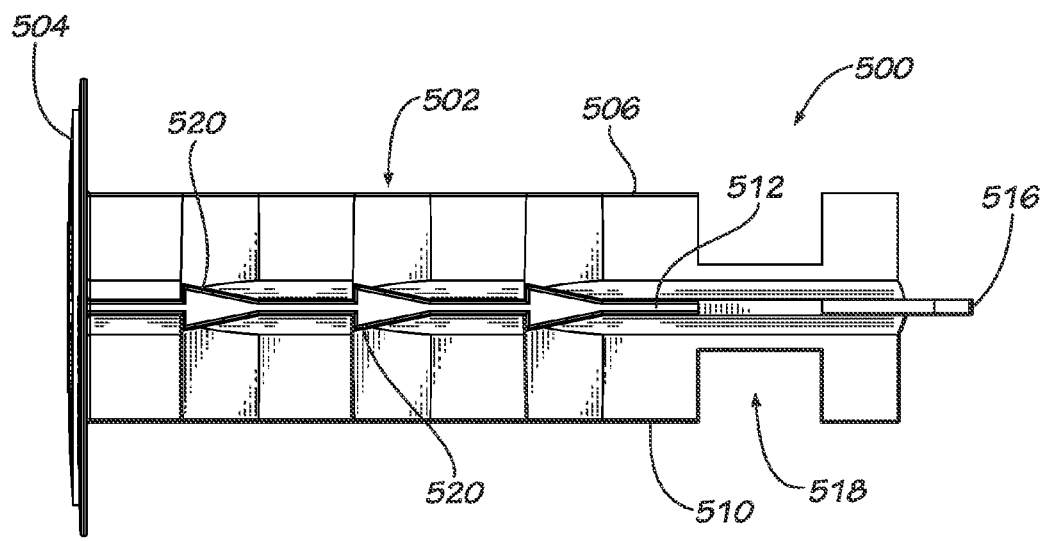
FIG. 33 is a side view of the panel anchor member shown in FIG. 31.
Figure 41:
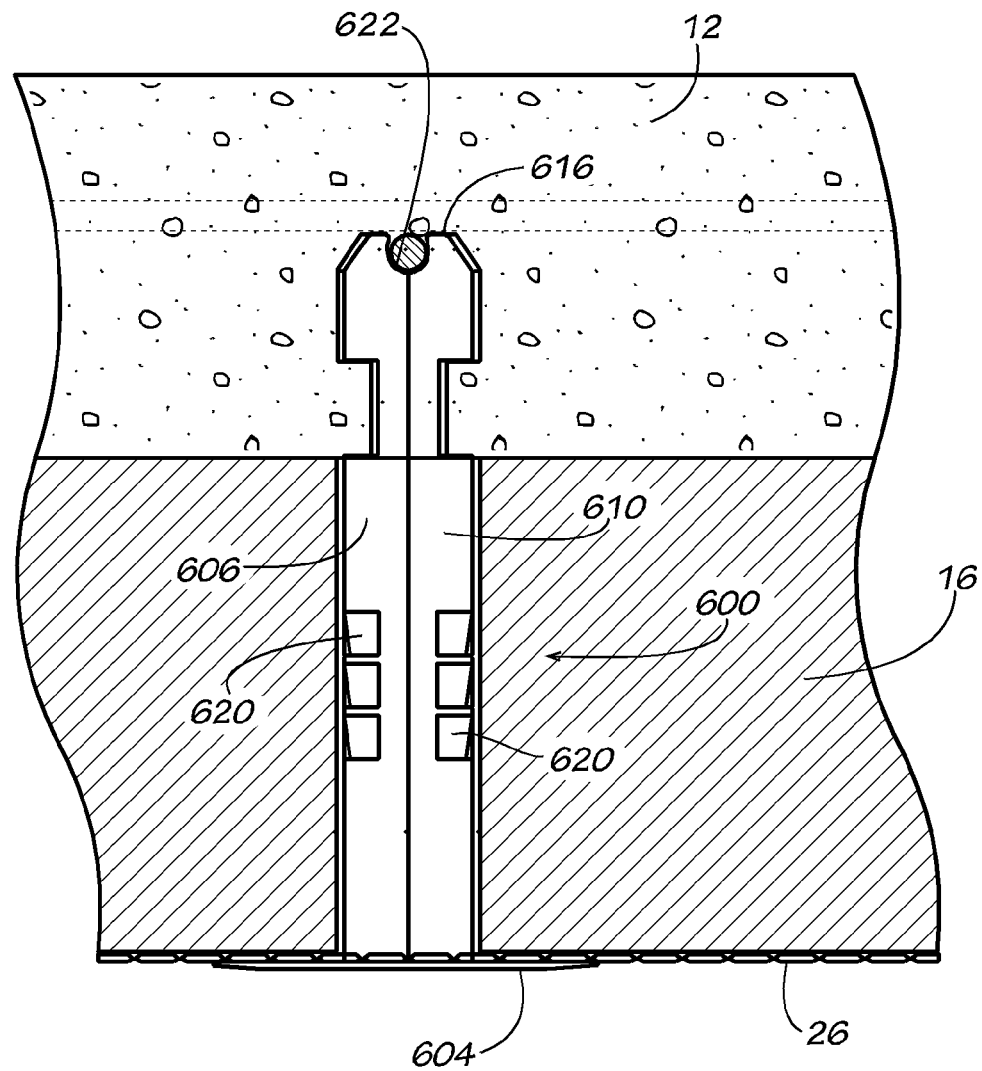
FIG. 41 is a partial cross-sectional side view of another disclosed embodiment of the precast infill concrete panel shown in FIG. 7 using the panel anchor member shown in FIG. 37.
Figure 42:
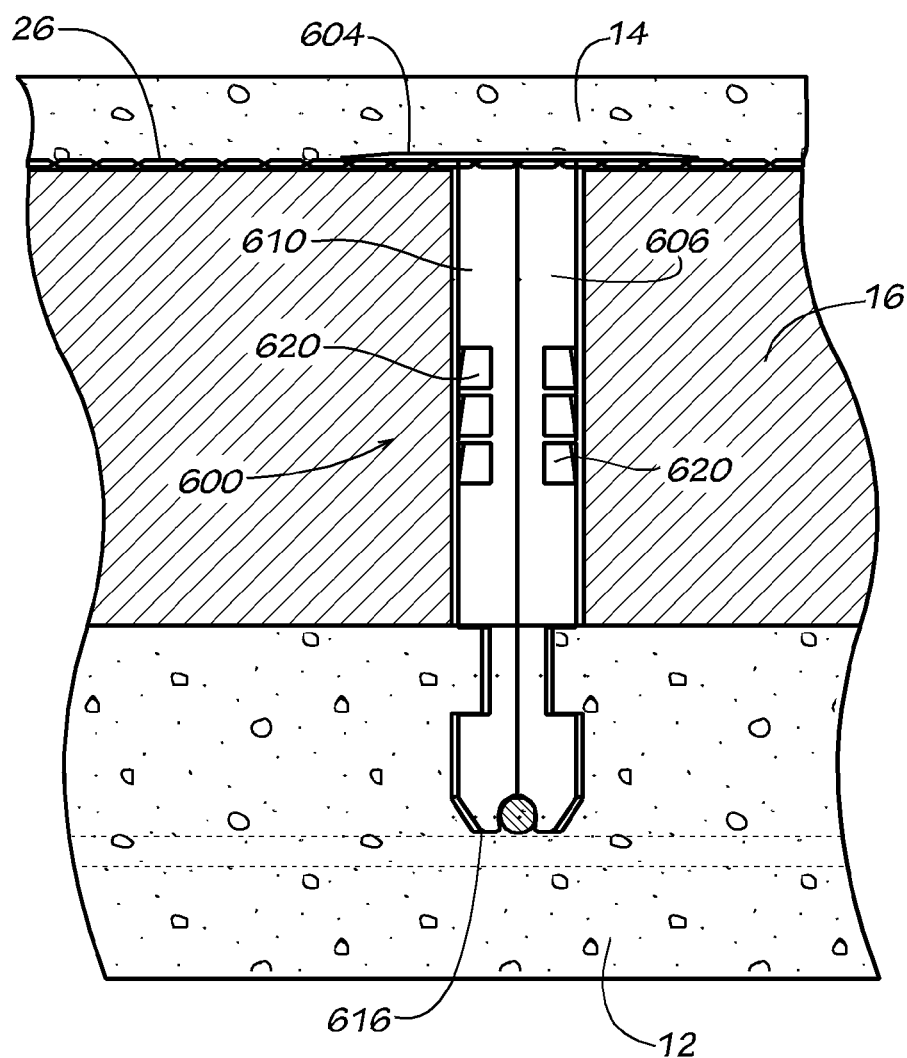
FIG. 42 is a partial cross-sectional side view of another disclosed embodiment of the precast infill concrete panel shown in FIG. 7 using the panel anchor member shown in FIG. 37.

Each panel anchor member 500 includes an elongate panel-penetrating portion 502 and a flange 504 at an end of the panel-penetrating portion. The flange 504 can be any suitable shape, such as square, oval or the like, but in this embodiment is shown as circular. The flange 504 prevents the panel anchor member 500 from pulling out of the foam insulating panel 16. The flange 504 also traps the layer of mesh/lath 26 between it and exterior surface 20 the foam insulating panel 16, thereby attaching the layer of mesh/lath to the foam insulating panel. The panel-penetrating portion 502 can be any suitable cross-sectional shape, such as square, round, oval or the like, but in this embodiment is shown as having a generally plus sign ("+") cross-sectional shape. The panel-penetrating portion 502 comprises four leg members 506, 508, 510, 512 (FIGS. 31-35) extending radially outwardly from a central core member 514. The plus sign ("+") cross-sectional shape of the panel-penetrating portion 502 prevents the panel anchor member 500 from rotating around its longitudinal axis during concrete placement. Formed adjacent an end 516 of the panel anchor member 500 opposite the flange 504 is a notch 518. The notch 518 is formed in each of the legs 506-512 adjacent the end 516 of the panel anchor member 500. The notch 518 can be any shape, such as triangular, round, oval or the like, but in this embodiment is shown as having a generally rectangular shape (FIGS. 32 and 33). On each of the legs 506-512 intermediate the flange 504 and the notch 518 are a plurality of fins 520 projecting outwardly from each of the legs. The fins 520 can be any suitable shape, such as round, but in this embodiment are shown as generally rectangular and flaring outwardly from the legs 506-512 toward the flange 504. The fins 520 help retain the panel anchor member 500 after it is inserted in the foam insulating panel 16. This prevents the panel anchor member 500 from falling out of the foam insulating panel 16 during transportation and setup. Each of the legs 506, 510 includes a U-shaped cutout 522 adjacent the end 516 of the panel anchor member 500. The U-shaped cutout 522 is designed and adapted to receive and hold a thin or small gauge rebar or wire mesh for reinforcing the interior structural wythe 12.

In FIGS. 37-42 there is shown an alternate disclosed embodiment of the panel anchor member 600. The panel anchor member 600 can be used in the same manner as the panel anchor member 28 described above. The foam insulating panel 16 includes a plurality of panel anchor members, such as the panel anchor member 600. Each panel anchor member 600 is preferably formed from a polymeric material, such as polyethylene, polypropylene, nylon, acrylonitrile-butadiene-styrene (ABS), glass filled thermoplastics or the like. For particularly large or heavy structures, the panel anchor member 600 is preferably formed from glass or mineral fiber filled thermoplastics, such as nylon. The panel anchor member 600 can be formed by any suitable process, such as by injection molding or by pultrusion.

Each panel anchor member 600 includes an elongate panel-penetrating portion 602 and a flange 604 at an end of the panel-penetrating portion. The flange 604 can be any suitable shape, such as square, oval or the like, but in this embodiment is shown as circular. The flange 604 prevents the panel anchor member 600 from pulling out of the foam insulating panel 16. The flange 604 also traps the layer of mesh/lath 26 between it and exterior surface 20 the foam insulating panel 16, thereby attaching the layer of mesh/lath to the foam insulating panel. The panel-penetrating portion 602 can be any suitable cross-sectional shape, such as square, round, oval or the like, but in this embodiment is shown as having a generally "Y" cross-sectional shape. The panel-penetrating portion 502 comprises three leg members 606, 608, 610 (FIGS. 38-40) extending radially outwardly from a central core member 614. The "Y" cross-sectional shape of the panel-penetrating portion 602 prevents the panel anchor member 600 from rotating around its longitudinal axis during concrete placement. Formed adjacent an end 616 of the panel anchor member 600 opposite the flange 604 is a notch 618. The notch 618 is formed in each of the legs 606-610 adjacent the end 616 of the panel anchor member 600. The notch 618 can be any shape, such as triangular, round, oval or the like, but in this embodiment is shown as having a generally rectangular shape (FIG. 35). On each of the legs 606-610 intermediate the flange 604 and the notch 618 are a plurality of fins 620 projecting outwardly from the legs. The fins 620 can be any suitable shape, such as round, but in this embodiment are shown as generally rectangular and flaring outwardly from the legs 606-610 toward the flange 604. The fins 620 help retain the panel anchor member 600 after it is inserted in the foam insulating panel 16 (FIGS. 39 and 40). This prevents the panel anchor member 600 from falling out of the foam insulating panel 16 during transportation and setup. Each of the legs 606-610 includes a U-shaped cutout 622 adjacent the end 616 of the panel anchor member 600. The U-shaped cutout 622 is designed and adapted to receive and hold a thin gauge rebar or wire mesh for reinforcing the interior structural wythe 12.

Optionally, a concrete densifier can be applied to the exterior surface 366 of the exterior non-structural wythe 14. Concrete densifiers are chemical applied to a concrete surface in order to fill pores, thereby increasing surface density. Densifiers may use various carrying agents to accomplish the hardening process, potassium, sodium, lithium, or other agents. Densifiers are usually applied to concrete as soon as it sets, for example after approximately 24 hours. Concrete densifiers are commercially available from many sources including, but not limited to, Xtreme Hard from C.S. Desnifier, LLC, Deerfield Beach, Fla., USA; Liquid Hard from W. R. Meadows, Inc., Hampshire, Ill., USA; Formula One from L.M. Scofield Company, Douglasville, Ga., USA; and Surfhard (a water-based magnesium fluorosilicate solution that reacts chemically with alkaline materials in concrete to produce a more dense, durable, and chemically resistant) and EUCO Diamond Hard (a unique blend of siliconate and silicate polymer technology that penetrates deep into concrete surfaces and chemically reacts to produce an extremely dense and durable concrete) from The Euclid Chemical Company, Cleveland, Ohio, USA. Densifiers are usually in liquid form and can be applied to the exterior surface 366 of the exterior wythe 14 by any suitable means, such as by spraying.

It is specifically contemplated that architectural or decorative features optionally can be included on the exterior surface 366 of the exterior non-structural wythe 14. Foam structures having architectural or decorative designs (not shown) can be attached to the exterior surface 20 of the foam insulating panel 16 before the concrete, plaster, mortar or polymer modified concrete from which the exterior non-structural wythe 14 is applied thereto. After such architectural or decorative foam structures are attached to the exterior surface 20 of the foam insulating panel 16 (and to the mesh/lath 26, if present), concrete, plaster, mortar or polymer modified concrete can be applied to the surface of the architectural or decorative foam structures and any exposed exterior surface 20 of the foam insulating panel 16 so as to form a continuous contoured or decorative design for the exterior non-structural wythe 14. When such architectural or decorative foam structures are used, it is preferred that the concrete, plaster, mortar or polymer modified concrete be applied by spraying.

Figure 43:
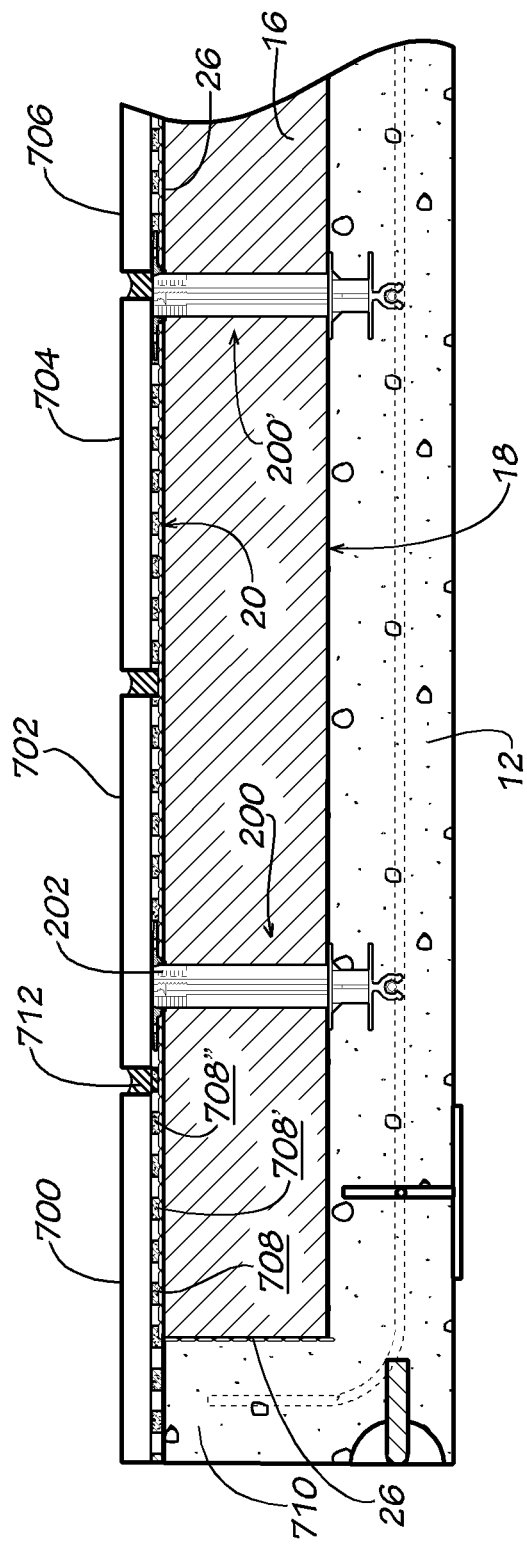
FIG. 43 is a partial cross-sectional side view of another disclosed embodiment of the precast infill concrete panel shown in FIGS. 15 and 16, showing the use of decorative exterior finishes, such as concrete, plaster, stucco, stone, brick, tile and the like, instead of an exterior concrete wythe.

In FIG. 43 there is shown an alternate disclosed embodiment of the interior structural wythe 12, as shown in FIGS. 15-16 and 22-23. There is shown the foam insulating panel 16, the panel anchor members 200, 200', the interior structural wythe 12 and the layer of mesh/layer 26. As stated above, the layer of mesh/lath 26 is captured between the locking cap 202 and the exterior surface 20 of the foam insulating panel 16 thereby holding the mesh/lath in place. As also stated above, the layer of mesh/lath 26 is adhesively attached to the exterior surface 20 of the foam insulating panel 16, such as with a 100% acrylic elastomeric waterproof membrane and air barrier. The layer of mesh/lath 26 therefore provides an excellent surface to which decorative or architectural exterior finishes can be attached. As shown in FIG. 43, there is shown a plurality of thin bricks 700, 702, 704, 706 attached to the layer of mesh/lath 26 on the exterior surface 20 of the foam insulating panel 16. The thin bricks 700-706 are attached to the layer of mesh/lath 26 by a suitable adhesive, such as thin set cement. The thin set cement is applied to the layer of mesh/lath 26 in a conventional manner, such as with a square-notched trowel, which makes ribbons of cement, such as 708, 708' and 708". The thin bricks 700-706 are then set into the cement ribbons, such as the ribbons 708-708", so that they are adhered to the layer of mesh/lath 26 and to the exterior surface 20 of the foam insulating panel 16. The thin bricks 700-706 are arranged in a desired pattern across the exterior surface 20 of the foam insulating panel 16, such as in rows and/or columns, or in another decorative pattern. As can also be seen in FIG. 43, the thin bricks 700-706 also covers the wrap-around portion 710 of the interior structural wythe 12, thereby providing a continuous, uninterrupted decorative covering of thin bricks on the exterior surface of the insulated concrete infill panel 10. In a another disclosed embodiment, the layer of mesh/lath 26 is not adhesively attached to the exterior surface 20 of the foam insulating panel 16 with an adhesive. In this case, the thin set adhesive will embed and surround the layer of mesh/lath 26 and bond the tile 700-706 and layer of mesh/lath to the exterior surface 20 of the foam insulating panel 16. Of course, the space between adjacent thin bricks 700-706 can be filled with grout or mortar 712 in a conventional manner. Although the panel shown in FIG. 43 shows the use of thin bricks as the decorative finish, it is specifically contemplated that other decorative finishes can also be used; such as tile; stone veneer for example marble, granite, or limestone; metal panel facing and the like.

Figure 44:
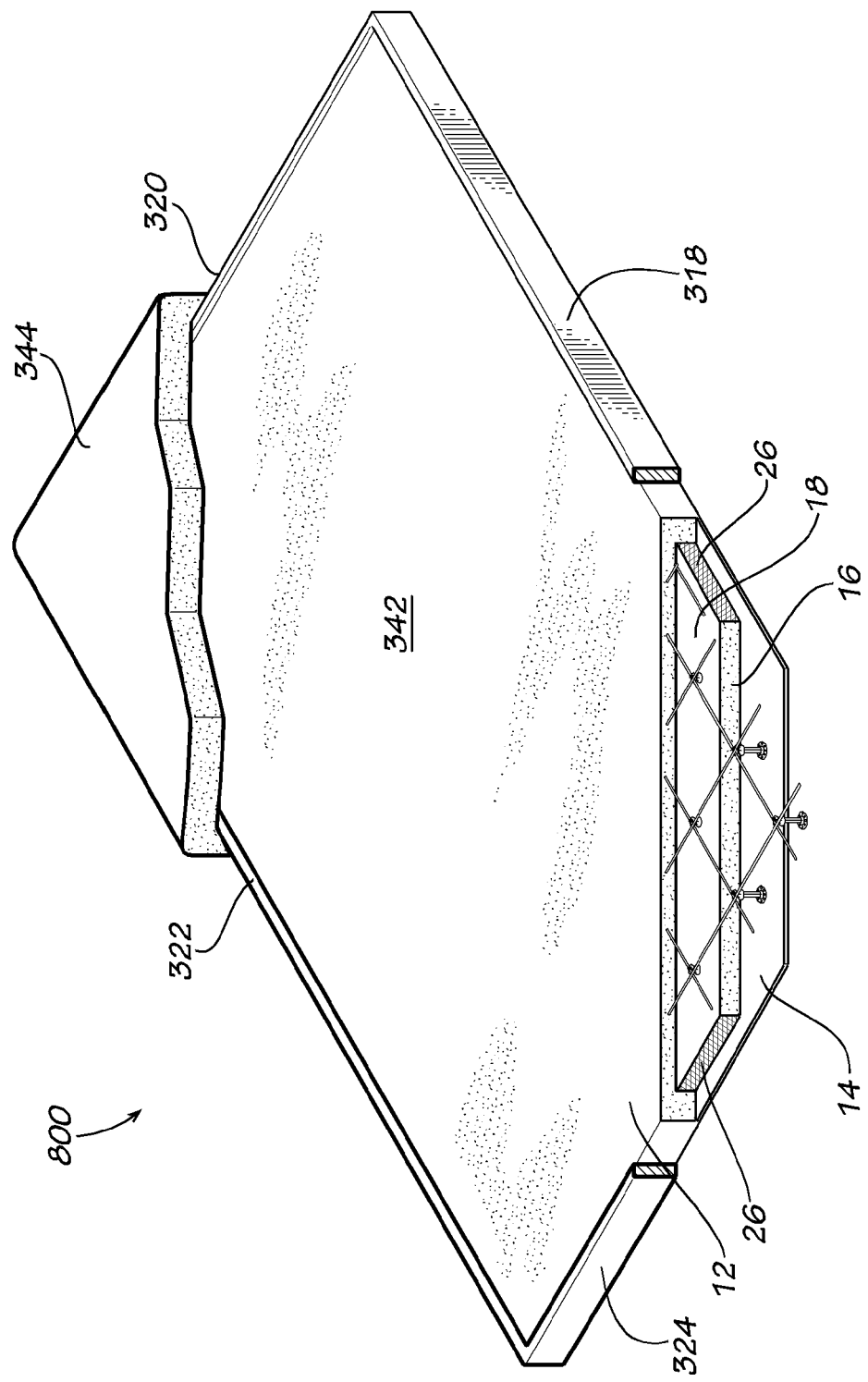
FIG. 44 is a partially broken away perspective view of a disclosed embodiment of a precast concrete wall panel form system in accordance with the present invention showing the formation of an interior structural layer of concrete, plaster or mortar and an exterior non-structural layer of polymer modified concrete, plaster or mortar of a precast concrete panel in accordance with a disclosed embodiment of the present invention.

In FIG. 44 there is show a method for casting the lightweight composite insulated concrete infill panel 10 without having to invert the panel in order to cure the cementitious-based materials from which it is made. A rectangular concrete form 800 is assembled on a casting surface (not shown), preferably a casting table, using the side form members 318-324. The casting surface can be insulated for an accelerated concrete curing process or it can be a conventional design. This concrete form is made to the dimensions of the interior structural wythe 12 and the exterior non-structural wythe 14 and of a depth equal to the thickness of the finished insulated concrete infill panel 10. The cementitious-based material from which the exterior non-structural wythe 14 is made is then placed into the form 800 to a depth equal to the thickness of the exterior non-structural wythe 14. The foam insulating panel 16 is then placed on top of the uncured cementitious-based material from which the exterior non-structural wythe 14 is made such that the layer of mesh/lath 26 of the exterior surface 20 of the foam insulating panel contacts the uncured cementitious-based material and the exterior surface 18 faces up. The foam insulating panel 16 is placed in the form 800 so that it is spaced from the side form members 318-324 an equal distance on all four sides. The form 800 is then filled with the cementitious-based material from which the interior structural wythe 12 is made; i.e., the cementitious-based material is placed on top of the exterior surface 18 of the foam insulating panel 16 and the on the exposed peripheral portion of the material from which exterior non-structural wythe 14 is made. After the top surface 342 of the cementitious-based material is finished, such as by troweling, the insulating material 344 is then optionally placed on top of the form 800 and its contents. Preferably, the cementitious-based material in the form 800 is cured according to a predetermined temperature profile, as described above. In another disclosed embodiment, the insulating material 344 is not used and the cementitious-based material in the form 800 is cured under ambient conditions. In another disclosed embodiment, the insulating material 344 is not used and the cementitious-based material in the form 800 is steam cured in a manner known in the art. After the cementitious-based material in the form 800 achieves a desired amount or degree of cure, the side form members 318-324 are removed and the insulating material 344 is removed, if present. The finished insulated concrete panel 10 is then ready for use.

While the present invention can be used with conventional concrete mixes; i.e., concrete in which portland cement is the only cementitious material used in the concrete, it is preferred as a part of the present invention to use the concrete, plaster or mortar mixes disclosed in U.S. Pat. No. 8,545,749 (the disclosure of which is incorporated herein by reference in its entirety). Concrete is a composite material consisting of a mineral-based hydraulic binder which acts to adhere mineral particulates together in a solid mass; those particulates may consist of coarse aggregate (rock or gravel), fine aggregate (natural sand or crushed fines), and/or unhydrated or unreacted cement. Specifically, the concrete mix in accordance with the present invention comprises cementitious material, aggregate and water sufficient to at least partially hydrate the cementitious material. The amount of cementitious material used relative to the total weight of the concrete varies depending on the application and/or the strength of the concrete desired. Generally speaking, however, the cementitious material comprises approximately 25% to approximately 40% by weight of the total weight of the concrete, exclusive of the water, or 300 lbs/yd$^3$ of concrete (177 kg/m$^3$) to 1,100 lbs/yd$^3$ of concrete (650 kg/m$^3$) of concrete. The water-to-cementitious material ratio by weight is usually approximately 0.25 to approximately 0.7. Relatively low water-to-cementitious material ratios lead to higher strength but lower workability, while relatively high water-to-cementitious material ratios lead to lower strength, but better workability. Aggregate usually comprises 70% to 80% by volume of the concrete. However, the relative amount of cementitious material to aggregate to water is not a critical feature of the present invention; conventional amounts can be used. Nevertheless, sufficient cementitious material should be used to produce concrete with an ultimate compressive strength of at least 1,000 psi, preferably at least 2,000 psi, more preferably at least 3,000 psi, most preferably at least 4,000 psi, especially up to about 10,000 psi or more.

The aggregate used in the concrete used with the present invention is not critical and can be any aggregate typically used in concrete including, but not limited to, aggregate meeting the requirements of ASTM C33. The aggregate that is used in the concrete depends on the application and/or the strength of the concrete desired. Such aggregate includes, but is not limited to, fine aggregate, medium aggregate, coarse aggregate, sand, gravel, crushed stone, lightweight aggregate, recycled aggregate, such as from construction, demolition and excavation waste, and mixtures and combinations thereof.

The preferred cementitious material for use with the present invention comprises Portland cement; preferably Portland cement and one of slag cement or fly ash; and more preferably Portland cement, slag cement and fly ash. Slag cement is also known as ground granulated blast-furnace slag (GGBFS). The cementitious material preferably comprises a reduced amount of Portland cement and increased amounts of recycled supplementary cementitious materials; i.e., slag cement and/or fly ash. This results in cementitious material and concrete that is more environmentally friendly. One or more cementitious materials other than slag cement or fly ash can also replace the Portland cement, in whole or in part. Such other cementitious or pozzolanic materials include, but are not limited to, silica fume; metakaolin; rice hull (or rice husk) ash; ground burnt clay bricks; brick dust; bone ash; animal blood; clay; other siliceous, aluminous or aluminosiliceous materials that react with calcium hydroxide in the presence of water; hydroxide-containing compounds, such as sodium hydroxide, magnesium hydroxide, or any other compound having reactive hydrogen groups, other hydraulic cements and other pozzolanic materials. The portland cement can also be replaced, in whole or in part, by one or more inert or filler materials other than Portland cement, slag cement or fly ash. Such other inert or filler materials include, but are not limited to limestone powder; calcium carbonate; titanium dioxide; quartz; or other finely divided minerals that densify the hydrated cement paste.

The preferred cementitious material for use with a disclosed embodiment of the present invention comprises 0% to approximately 100% by weight portland cement; preferably, 0% to approximately 80% by weight portland cement. The ranges of 0% to approximately 100% by weight portland cement and 0% to approximately 80% by weight portland cement include all of the intermediate percentages; such as, 5%, 10%, 15%, 20%, 25%, 30%, 35%, 40%, 45%, 50%, 55%, 60%, 65%, 70%, 75%, 80%, 85%, 90% and 95%. The cementitious material of the present invention can also comprise 0% to approximately 90% by weight portland cement, preferably 0% to approximately 80% by weight portland cement, preferably 0% to approximately 70% by weight portland cement, more preferably 0% to approximately 60% by weight portland cement, most preferably 0% to approximately 50% by weight portland cement, especially 0% to approximately 40% by weight portland cement, more especially 0% to approximately 30% by weight portland cement, most especially 0% to approximately 20% by weight portland cement, or 0% to approximately 10% by weight portland cement. In one disclosed embodiment, the cementitious material comprises approximately 10% to approximately 45% by weight portland cement, more preferably approximately 10% to approximately 40% by weight portland cement, most preferably approximately 10% to approximately 35% by weight portland cement, especially approximately 33⅓% by weight portland cement, most especially approximately 10% to approximately 30% by weight portland cement. In another disclosed embodiment of the present invention, the cementitious material comprises approximately 5% by weight portland cement, approximately 10% by weight portland cement, approximately 15% by weight portland cement, approximately 20% by weight portland cement, approximately 25% by weight portland cement, approximately 30% by weight portland cement, approximately 35% by weight portland cement, approximately 40% by weight portland cement, approximately 45% by weight portland cement or approximately 50% by weight portland cement or any sub-combination thereof.

The preferred cementitious material for use in one disclosed embodiment of the present invention also comprises 0% to approximately 90% by weight slag cement, preferably approximately 20% to approximately 90% by weight slag cement, more preferably approximately 30% to approximately 80% by weight slag cement, most preferably approximately 30% to approximately 70% by weight slag cement, especially approximately 30% to approximately 60% by weight slag cement, more especially approximately 30% to approximately 50% by weight slag cement, most especially approximately 30% to approximately 40% by weight slag cement. In another disclosed embodiment the cementitious material comprises approximately 33⅓% by weight slag cement. In another disclosed embodiment of the present invention, the cementitious material can comprise approximately 5% by weight slag cement, approximately 10% by weight slag cement, approximately 15% by weight slag cement, approximately 20% by weight slag cement, approximately 25% by weight slag cement, approximately 30% by weight slag cement, approximately 35% by weight slag cement, approximately 40% by weight slag cement, approximately 45% by weight slag cement, approximately 50% by weight slag cement, approximately 55% by weight slag cement, approximately 60% by weight slag cement, approximately 65%, approximately 70% by weight slag cement, approximately 75% by weight slag cement, approximately 80% by weight slag cement, approximately 85% by weight slag cement or approximately 90% by weight slag cement or any sub-combination thereof.

The preferred cementitious material for use in one disclosed embodiment of the present invention, especially for the interior structural wythe 12, also comprises 0% to approximately 50% by weight fly ash; preferably approximately 10% to approximately 45% by weight fly ash, more preferably approximately 10% to approximately 40% by weight fly ash, most preferably approximately 10% to approximately 35% by weight fly ash, especially approximately 33⅓% by weight fly ash. In another disclosed embodiment of the present invention, the preferred cementitious material comprises 0% by weight fly ash, approximately 5% by weight fly ash, approximately 10% by weight fly ash, approximately 15% by weight fly ash, approximately 20% by weight fly ash, approximately 25% by weight fly ash, approximately 30% by weight fly ash, approximately 35% by weight fly ash, approximately 40% by weight fly ash, approximately 45% by weight fly ash or approximately 50% by weight fly ash or any sub-combination thereof.

Preferably the fly ash has an average particle size of <10 µm; more preferably 90% or more of the particles have a particles size of <10 µm.

The preferred cementitious material for use in one disclosed embodiment of the present invention, especially for the exterior non-structural wythe 14, also comprises 0% to approximately 80% by weight fly ash, preferably approximately 10% to approximately 75% by weight fly ash, preferably approximately 10% to approximately 70% by weight fly ash, preferably approximately 10% to approximately 65% by weight fly ash, preferably approximately 10% to approximately 60% by weight fly ash, preferably approximately 10% to approximately 55% by weight fly ash, preferably approximately 10% to approximately 50% by weight fly ash, preferably approximately 10% to approximately 45% by weight fly ash, more preferably approximately 10% to approximately 40% by weight fly ash, most preferably approximately 10% to approximately 35% by weight fly ash, especially approximately 33⅓% by weight fly ash. In another disclosed embodiment of the present invention, the preferred cementitious material comprises 0% by weight fly ash, approximately 5% by weight fly ash, approximately 10% by weight fly ash, approximately 15% by weight fly ash, approximately 20% by weight fly ash, approximately 25% by weight fly ash, approximately 30% by weight fly ash, approximately 35% by weight fly ash, approximately 40% by weight fly ash, approximately 45% by weight fly ash or approximately 50% by weight fly ash, approximately 55% by weight fly ash, approximately 60% by weight fly ash, approximately 65% by weight fly ash, approximately 70% by weight fly ash or approximately 75% by weight fly ash, approximately 80% by weight fly ash or any sub-combination thereof. Preferably the fly ash has an average particle size of <10 µm; more preferably 90% or more of the particles have a particles size of <10 µm.

In one disclosed embodiment, the preferred cementitious material for use with the present invention comprises approximately equal parts by weight of portland cement, slag cement and fly ash; i.e., approximately 33⅓% by weight portland cement, approximately 33⅓% by weight slag cement and approximately 33⅓% by weight fly ash. In another disclosed embodiment, a preferred cementitious material for use with the present invention has a weight ratio of portland cement to slag cement to fly ash of 1:1:1. In another disclosed embodiment, the preferred cementitious material for use with the present invention has a weight ratio of portland cement to slag cement to fly ash of approximately 0.85-1.15:0.85-1.15:0.85-1.15, preferably approximately 0.9-1.1:0.9-1.1:0.9-1.1, more preferably approximately 0.95-1.05:0.95-1.05:0.95-1.05.

The cementitious material disclosed above can also optionally include 0.1% to approximately 10% by weight Wollastonite. Wollastonite is a calcium inosilicate mineral ($CaSiO_3$) that may contain small amounts of iron, magnesium, and manganese substituted for calcium. In addition the cementitious material can optionally include 0.1-25% calcium oxide (quick lime), calcium hydroxide (hydrated lime), calcium carbonate or latex or polymer admixtures, either mineral or synthetic, that have reactive hydroxyl groups.

In one disclosed embodiment, the cementitious material for use with the present invention comprises 0% to approximately 100% by weight portland cement, 0% to approximately 90% by weight slag cement, and 0% to approximately 80% by weight fly ash. In one disclosed embodiment, the cementitious material for use with the present invention comprises 0% to approximately 80% by weight portland cement, 0% to approximately 90% by weight slag cement, and 0% to approximately 80% by weight fly ash. In another disclosed embodiment, the cementitious material for use with the present invention comprises 0% to approximately 70% by weight portland cement, 0% to approximately 90% by weight slag cement, and 0% to approximately 80% by weight fly ash. In another disclosed embodiment, the cementitious material for use with the present invention comprises 0% to approximately 60% by weight portland cement, 0% to approximately 90% by weight slag cement, and 0% to approximately 80% by weight fly ash. In another disclosed embodiment, the cementitious material for use with the present invention comprises 0% to approximately 50% by weight portland cement, 0% to approximately 90% by weight slag cement, and 0% to approximately 80% by weight fly ash. In another disclosed embodiment, the cementitious material for use with the present invention comprises less than 50% by weight portland cement, 10% to approximately 90% by weight slag cement, and 10% to approximately 80% by weight fly ash. In another disclosed embodiment, the cementitious material for use with the present invention comprises approximately 10% to approximately 45% by weight portland cement, approximately 10% to approximately 90% by weight slag cement, and 10% to approximately 80% by weight fly ash. In another disclosed embodiment, the cementitious material for use with the present invention comprises approximately 10% to approximately 40% by weight portland cement, approximately 10% to approximately 90% by weight slag cement, and 10% to approximately 80% by weight fly ash. In another disclosed embodiment, the cementitious material for use with the present invention comprises approximately 10% to approximately 35% by weight portland cement, approximately 10% to approximately 90% by weight slag cement, and 10% to approximately 80% by weight fly ash.

In another disclosed embodiment, the cementitious material for use with the present invention, especially for the exterior non-structural wythe 14, comprises 0% to approximately 100% by weight portland cement; 0% to approximately 90% by weight slag cement; 0% to approximately 80% by weight fly ash; 0% to 10% by weight Wollastonite; and 0% to approximately 25% by weight calcium oxide, calcium hydroxide, or latex or polymer admixtures, either mineral or synthetic, that have reactive hydroxyl groups, or mixtures thereof. In one disclosed embodiment, the cementitious material for use with the present invention comprises 0% to approximately 80% by weight portland cement; 0% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 70% by weight portland cement; 0% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 60% by weight portland cement; 0% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 50% by weight portland cement; 0% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight portland cement; 10% to approximately 90% by weight slag cement; 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 45% by weight portland cement; approximately 10% to approximately 90% by weight slag cement; 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 40% by weight portland cement; approximately 10% to approximately 90% by weight slag cement; 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 35% by weight portland cement; approximately 10% to approximately 90% by weight slag cement; 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material for use with the present invention comprises 0% to approximately 100% by weight portland cement; 0% to approximately 90% by weight slag cement; 0% to approximately 80% by weight fly ash; and 0.1% to 10% by weight Wollastonite. In one disclosed embodiment, the cementitious material for use with the present invention comprises 0% to approximately 80% by weight portland cement; 0% to approximately 90% by weight slag cement; 0% to approximately 80% by weight fly ash; and 0.1% to approximately 10% by weight Wollastonite. In another disclosed embodiment, the cementitious material for use with the present invention comprises 0% to approximately 70% by weight portland cement; 0% to approximately 90% by weight slag cement; 0% to approximately 80% by weight fly ash; and 0.1% to approximately 10% by weight Wollastonite. In another disclosed embodiment, the cementitious material for use with the present invention comprises 0% to approximately 60% by weight portland cement; 0% to approximately 90% by weight slag cement; 0% to approximately 80% by weight fly ash; and 0.1% to approximately 10% by weight Wollastonite. In another disclosed embodiment, the cementitious material for use with the present invention comprises 0% to approximately 50% by weight portland cement; 0% to approximately 90% by weight slag cement; 0% to approximately 80% by weight fly ash; and 0.1% to approximately 10% by weight Wollastonite. In another disclosed embodiment, the cementitious material for use with the present invention comprises less than 50% by weight portland cement; 10% to approximately 90% by weight slag cement; 10% to approximately 80% by weight fly ash; and 0.1% to approximately 10% by weight Wollastonite. In another disclosed embodiment, the cementitious material for use with the present invention comprises approximately 10% to approximately 45% by weight portland cement; approximately 10% to approximately 90% by weight slag cement; 10% to approximately 80% by weight fly ash; and 0.1% to approximately 10% by weight Wollastonite. In another disclosed embodiment, the cementitious material for use with the present invention comprises approximately 10% to approximately 40% by weight portland cement; approximately 10% to approximately 90% by weight slag cement; 10% to approximately 80% by weight fly ash; and 0.1% to approximately 10% by weight Wollastonite. In another disclosed embodiment, the cementitious material for use with the present invention comprises approximately 10% to approximately 35% by weight portland cement; approximately 10% to approximately 90% by weight slag cement; 10% to approximately 80% by weight fly ash; and 0.1% to approximately 10% by weight Wollastonite.

The portland cement, slag cement and fly ash can be combined physically or mechanically in any suitable manner and is not a critical feature. For example, the portland cement, slag cement and fly ash can be mixed together to form a uniform blend of dry material prior to combining with the aggregate and water. Or, the portland cement, slag cement and fly ash can be added separately to a conventional concrete mixer, such as the transit mixer of a ready-mix concrete truck, at a batch plant. The water and aggregate can be added to the mixer before the cementitious material, however, it is preferable to add the cementitious material first, the water second, the aggregate third and any makeup water last.

Chemical admixtures can also be used with the preferred concrete for use with the present invention. Such chemical admixtures include, but are not limited to, accelerators, retarders, air entrainments, plasticizers, superplasticizers, coloring pigments, corrosion inhibitors, bonding agents and pumping aid. Although chemical admixtures can be used with the concrete of the present invention, it is believed that chemical admixtures are not necessary.

Mineral admixtures or additional supplementary cementitious material ("SCM") can also be used with the concrete of the present invention. Such mineral admixtures include, but are not limited to, silica fume and high reactivity metakaolin. Although mineral admixtures can be used with the concrete of the present invention, it is believed that mineral admixtures are not necessary.

For the thin exterior wythe 14, any type of mortar, stucco, geopolymers, cement plaster, cementitious or polymer modified cement plasters, polymer modified stucco, acrylic base coat and finish coat materials can be used to achieve any architectural type finish texture or color.

The concrete mix cured in a concrete form in which the temperature of the curing concrete is controlled in accordance with the present invention, especially controlled to follow a predetermined temperature profile, produces concrete with superior early strength and ultimate strength properties compared to the same concrete mix cured in a conventional form without the use of any chemical additives to accelerate or otherwise alter the curing process. Thus, in one disclosed embodiment of the present invention, the preferred cementitious material comprises at least two of portland cement, slag cement and fly ash in amounts such that at seven days the concrete mix cured in accordance with the present invention has a compressive strength at least 25% greater than the same concrete mix would have after seven days in a conventional (i.e., non-insulated) concrete form under ambient conditions. In another disclosed embodiment, the preferred concrete mix cured in accordance with the present invention has a compressive strength at least 50%, at least 100%, at least 150%, at least 200%, at least 250% or at least 300% greater than the same concrete mix would have after seven days in a conventional (i.e., non-insulated) concrete form under the same conditions.

In another disclosed embodiment of the present invention, the preferred cementitious material comprises portland cement, slag cement and fly ash in amounts such that at seven days the concrete mix cured in accordance with the present invention has a compressive strength at least 25% greater than the same concrete mix would have after seven days in a conventional concrete form under ambient conditions. In another disclosed embodiment the preferred concrete mix cured in accordance with the present invention has a compressive strength at least 50%, at least 100%, at least 150%, at least 200%, at least 250% or at least 300% greater than the same concrete mix would have after seven days in a conventional (i.e., non-insulated) concrete form under the same conditions.

In another disclosed embodiment of the present invention, the preferred cementitious material comprises portland cement and slag cement in amounts such that at seven days the concrete mix cured in accordance with the present invention has a compressive strength at least 25% greater than the same concrete mix would have after seven days in a conventional concrete form under ambient conditions. In another disclosed embodiment, the preferred concrete mix cured in accordance with the present invention has a compressive strength at least 50%, at least 100%, at least 150%, at least 200%, at least 250% or at least 300% greater than the same concrete mix would have after seven days in a conventional (i.e., non-insulated) concrete form under the same conditions.

In another disclosed embodiment of the present invention, the preferred cementitious material comprises portland cement and fly ash in amounts such that at seven days the concrete mix cured in accordance with the present invention has a compressive strength at least 25% greater than the same concrete mix would have after seven days in a conventional concrete form under ambient conditions. In another disclosed embodiment the preferred concrete mix cured in accordance with the present invention has a compressive strength at least 50%, at least 100%, at least 150%, at least 200%, at least 250% or at least 300% greater than the same concrete mix would have after seven days in a conventional (i.e., non-insulated) concrete form under the same conditions.

As a part of the present invention, it has been found that concrete, mortar or other cementitious-based materials, especially polymer modified concrete, will bond quite securely with expanded polystyrene foam that has not been formed in a mold so that the surface of the foam does not have a polished or shinny surface. Suitable polystyrene foam can be obtained by cutting, such as with a knife blade, a saw or a hot wire, foam panels of a desired thickness from a larger block of polystyrene foam. The bond between the concrete, mortar or other cementitious-based materials and polystyrene foam is also enhanced by using the concrete mix comprising portland cement, slag cement and fly ash, as disclosed above. Furthermore, the bond between the concrete, mortar or other cementitious-based materials and polystyrene foam is also enhanced by curing the concrete, mortar or other cementitious-based materials in insulated concrete forms or molds, as disclosed herein. Additionally, the bond between the concrete, mortar or other cementitious-based materials and polystyrene foam is also enhanced by curing the concrete, mortar or other cementitious-based materials at elevated temperatures, such as produced by the insulated concrete forms, electrically heated blankets, electrically heated concrete forms or steam curing, for example above 100° F. (approximately 35° C.), for an extended period of time, such as 1 day to 3 days; preferably, 1 day to 7 days. Under these conditions, the concrete, mortar or other cementitious-based materials and polystyrene foam seem to fuse together. In fact, the bond between the concrete, mortar or other cementitious-based materials and polystyrene foam, as disclosed above, is so strong that the bond between individual polystyrene foam beads will fail before the bond between the concrete, mortar or other cementitious-based materials and the polystyrene foam.

It is specifically contemplated that the cementitious-based material from which the interior structural wythe 12 and the exterior non-structural wythe 14 are made can include reinforcing fibers made from material including, but not limited to, steel, plastic polymers, glass, basalt, carbon, and the like. The use of reinforcing fiber is particularly preferred in the interior structural wythe 12 and the exterior non-structural wythe 14 made from polymer modified concrete, mortar and plasters, which provide the lightweight composite insulated concrete panel 10 in accordance with the present invention improved flexural strength, as well as improved wind load capability and blast and seismic resistance.

The foregoing panel has been illustrated as a solid panel. Of course, for various building designs, some panels may need to have openings for doors and/or windows. It is specifically contemplated that the panel in accordance with the present invention can include such openings. Furthermore, when openings are designed into the panel of the present invention, it may be necessary to add additional stiffness to the panel in view of the openings for doors and/or windows. Thus, the panel in accordance with the present invention can include stiffening ribs, beams, columns, and the like, and still be within the scope of the present invention.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A method of forming a composite insulated concrete panel comprising:
   placing a foam insulating panel on a flat horizontal surface, the foam insulating panel having a first primary surface and an opposite second primary surface, an elongate anchor member having a definite length defined by a first end and an opposite second end, a first portion of the anchor member extending from the first primary surface to the second primary surface of the foam insulating panel, a second portion of the anchor member extending outwardly from the second primary surface of the foam insulating panel, an enlarged portion on the first end of the elongate anchor member, the enlarged portion contacting the first primary surface of the foam insulating panel, wherein the enlarged portion is flush with the first primary surface of the foam insulating panel;

placing a quantity of plastic cementitious-based material on the second primary surface of the foam insulating panel;

forming the quantity of plastic cementitious-based material into a structural layer having a first primary surface and an opposite second primary surface such that the second end of the anchor member is embedded in the structural layer of cementitious-based material intermediate the first and second primary surfaces of the structural layer of cementitious-based material; and allowing the structural layer of plastic cementitious-based material to at least partially cure.

2. The method of forming a composite insulated concrete panel of claim 1 comprising raising the foam insulating panel and attached structural layer of cementitious-based material to a vertical position.

3. The method of forming a composite insulated concrete panel of claim 2 comprising applying an architectural non-structural layer of cementitious-based material to the first primary surface of the foam insulating panel.

4. The method of forming a composite insulated concrete panel of claim 3, wherein the structural layer of cementitious-based material is approximately 2 to approximately 8 inches thick.

5. The method of forming a composite insulated concrete panel of claim 3, wherein the architectural non-structural layer of cementitious-based material is approximately ⅛ inch to 2 inches thick and is less than 50% the thickness of the structural layer of cementitious-based material.

6. The method of forming a composite insulated concrete panel of claim 1 further comprising a layer of mesh disposed on and attached to the first primary surface of the foam insulating panel such that at least a portion of the layer of mesh is disposed between the enlarged portion on the elongate anchor member and the first primary surface of the foam insulating panel.

7. The method of forming a composite insulated concrete panel of claim 1, wherein the foam insulating panel is approximately 1 inch to approximately 8 inches thick.

8. A method of forming a composite insulated concrete panel comprising:

placing a foam insulating panel on a flat horizontal surface, the foam insulating panel having a first primary surface and an opposite second primary surface, an elongate anchor member having a definite length defined by a first end and an opposite second end, a first portion of the anchor member extending from the first primary surface to the second primary surface of the foam insulating panel, a second portion of the anchor member extending outwardly from the second primary surface of the foam insulating panel, a first enlarged portion on the first end of the elongate anchor member, the first enlarged portion contacting the first primary surface, wherein the first enlarged portion is flush with the first primary surface of the foam insulating panel, a second enlarged portion on the elongate anchor member intermediate the first and second ends thereof, the second enlarged portion contacting the second primary surface;

placing a quantity of plastic cementitious-based material on the second primary surface of the foam insulating panel;

forming the quantity of plastic cementitious-based material into a structural layer having a first primary surface and an opposite second primary surface such that the second end of the anchor member is embedded in the structural layer of cementitious-based material intermediate the first and second primary surfaces of the structural layer of cementitious-based material; and allowing the structural layer of plastic cementitious-based material to at least partially cure.

9. The method of forming a composite insulated concrete panel of claim 8 comprising raising the foam insulating panel and attached structural layer of cementitious-based material to a vertical position.

10. The method of forming a composite insulated concrete panel of claim 8 comprising applying an architectural non-structural layer of cementitious-based material to the first primary surface of the foam insulating panel.

11. The method of forming a composite insulated concrete panel of claim 10, wherein the architectural non-structural layer of cementitious-based material is approximately ⅛ inch to 2 inches thick and is less than 50% the thickness of the structural layer of cementitious-based material.

12. The method of forming a composite insulated concrete panel of claim 8, wherein the structural layer of cementitious-based material is approximately 2 to approximately 8 inches thick.

13. The method of forming a composite insulated concrete panel of claim 8 further comprising a layer of mesh disposed on and attached to the first primary surface of the foam insulating panel such that at least a portion of the layer of mesh is disposed between the enlarged portion on the elongate anchor member and the first primary surface of the foam insulating panel.

14. The method of forming a composite insulated concrete panel of claim 13, wherein the layer of mesh made from carbon fiber, fiberglass, basalt fiber, aramid fibers, polypropylene, polystyrene, vinyl, polyvinyl chloride or nylon.

15. The method of forming a composite insulated concrete panel of claim 8, wherein the foam insulating panel is approximately 1 inch to approximately 8 inches thick.

16. A method of forming a composite insulated concrete panel comprising:

forming an architectural non-structural layer of plastic cementitious-based material on a horizontal surface;

applying to the architectural non-structural layer of plastic cementitious-based material a foam insulating panel having a first primary surface and an opposite second primary surface, an elongate anchor member having a definite length defined by a first end and an opposite second end, a first portion of the anchor member extending from the first primary surface to the second primary surface of the foam insulating panel, a second portion of the anchor member extending outwardly from the second primary surface of the foam insulating panel, a first enlarged portion on the first end of the elongate anchor member, and a layer of reinforcing material substantially covering and adhered to the first primary surface of the foam insulating panel, wherein at least a portion of the layer of reinforcing material is captured between the first enlarged portion and the first primary surface of the foam insulating panel, and wherein the layer of reinforcing material contacts the architectural non-structural layer of plastic cementitious-based material such that the layer of reinforcing material is at least partially embedded in the architectural non-structural layer of plastic cementitious-based material;

placing a quantity of plastic cementitious-based material on the second primary surface of the foam insulating panel and forming it into a structural layer having a first primary surface and an opposite second primary surface such that the second end of the anchor member is embedded in the structural layer of cementitious-based material intermediate the first and second primary surfaces of the structural layer of cementitious-based material; and allowing the architectural and structural layers of plastic cementitious-based material to at least partially cure.

17. The method of forming a composite insulated concrete panel of claim 16 comprising raising the foam insulating panel and attached structural layer of cementitious-based material to a vertical position.

18. The method of forming a composite insulated concrete panel of claim 16, wherein the architectural non-structural layer of cementitious-based material is approximately ⅛ inch to 2 inches thick and is less than 50% the thickness of the structural layer of cementitious-based material.

19. The method of forming a composite insulated concrete panel of claim 16, wherein the architectural non-structural layer of cementitious-based material is approximately ⅛ inch to 2 inches thick and is less than 50% the thickness of the structural layer of cementitious-based material.

20. The method of forming a composite insulated concrete panel of claim 16, wherein the layer of reinforcing material is a discontinuous layer or mesh made from carbon fiber, fiberglass, basalt fiber, aramid fibers, polypropylene, polystyrene, vinyl, polyvinyl chloride or nylon.

* * * * *